United States Patent [19]

Duncan

[11] Patent Number: 4,857,814

[45] Date of Patent: Aug. 15, 1989

[54] ELECTRONIC MOTOR CONTROLS, LAUNDRY MACHINES INCLUDING SUCH CONTROLS AND/OR METHODS OF OPERATING SUCH CONTROLS

[75] Inventor: Gerald D. Duncan, Remuera, New Zealand

[73] Assignee: Fisher & Paykel, Auckland, New Zealand

[21] Appl. No.: 908,176

[22] Filed: Sep. 16, 1986

[30] Foreign Application Priority Data

Sep. 16, 1985 [GB] United Kingdom ................... 213489
Sep. 16, 1985 [GB] United Kingdom ................... 213490

[51] Int. Cl.⁴ .......................... H02P 1/22; H02P 3/12
[52] U.S. Cl. ..................................... 318/281; 318/138; 318/443; 318/254
[58] Field of Search ............... 318/138, 254, 280, 281, 318/282, 283, 284, 286, 430, 439, 443, 444, 445

[56] References Cited

U.S. PATENT DOCUMENTS

| | | | |
|---|---|---|---|
| 4,390,826 | 6/1983 | Erdman et al. | 318/254 X |
| 4,446,706 | 5/1984 | Hartwig | 318/801 X |
| 4,540,921 | 9/1985 | Boyd, Jr. et al. | 318/254 |
| 4,550,282 | 10/1985 | Hartwig et al. | 318/808 |
| 4,614,903 | 9/1986 | Betsch et al. | 318/443 |

Primary Examiner—Bentsu Ro
Attorney, Agent, or Firm—Christie, Parker & Hale

[57] ABSTRACT

A control apparatus and method for an electric motor having sensing devices which sense the frequency and polarity of EMFs in the rotor windings down to a condition where the rotor is in condition for reversing, and causing reversing of the motor when the frequency is such as to allow reversing and the polarits of a selected winding is at or near a zero crossing between positive and negative polarities. Cyclical reversal is effected by measuring the time the rotor takes to coast from a "power off" condition to the condition for reversing and with an electronically commutated motor reversing can usually be effected in one commutation period. The motor is used in a clothes washing machine or similar application where rapid reversal is required or timing of the time from one reversal to the next is required to be constant.

34 Claims, 14 Drawing Sheets

VOLTAGE DIGITISING CIRCUIT.

ONE HALF CYCLE

N.B. INITIAL PARAMETERS ARE:-
STROKE TIME - T STROKE
RAMP TIME - W RAMP
MAX SPEED - ENDSPEED

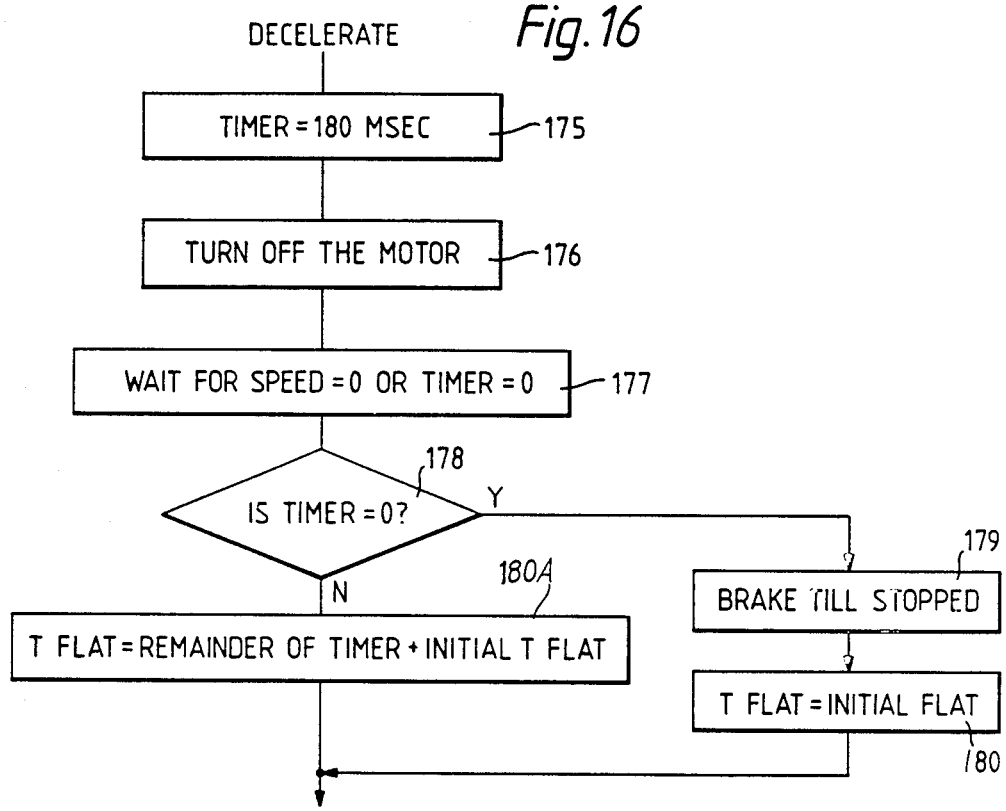
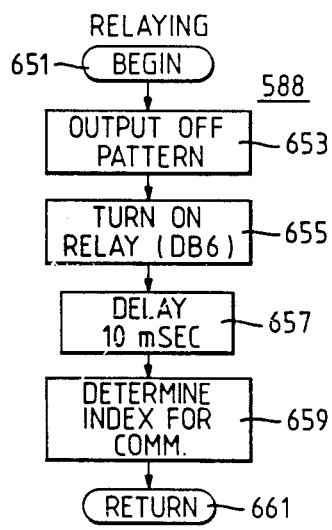
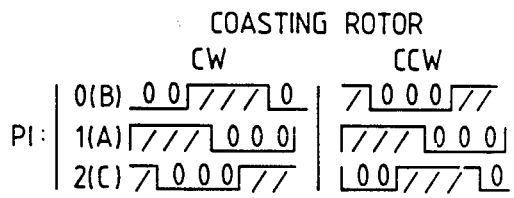

ELECTRONIC MOTOR CONTROLS, LAUNDRY MACHINES INCLUDING SUCH CONTROLS AND/OR METHODS OF OPERATING SUCH CONTROLS

This invention relates to electronic controls for electric motors, laundry machines including such controls and/or methods of operating said controls.

It is an object of the present invention to provide an electronic motor control for controlling electric motors and/or a laundry machine including such controls and/or a method of operating laundry machine using such controls which will at least provide the public with a useful choice.

Accordingly in one aspect the invention may broadly be said to consist in a method of cyclically reversing an electronically commutated motor having a plurality of windings on a stator and a rotor having magnetic poles rotatable relative to said stator and using electronic control apparatus and means to indicate the position of the rotor, said method comprising the steps of (a) Initiating and then continuing a correct sequence of commutations for a desired time or desired number of commutations, (b) Removing all power from the windings and allowing the rotor to coast towards zero rotation, (c) Testing the position of the rotor relative to the stator, and (d) When the rotor is in condition to be reversed and its position relative to the stator is known, changing the sequence of commutations to cause the rotor to change direction the correct commutations following automatically to maintain rotor rotation in the changed direction, and repeating the steps to give cyclical reversal for a desired time.

In a further aspect the invention consists in control apparatus for an electronically commutated motor having a plurality of windings on a stator adapted to be selectively commutated and a rotor having magnetic poles rotatable relative to said stator said control apparatus comprising:

(a) Timing means to time the period of rotation or counting means to count the number of rotations of the rotor in a desired direction, (b) Commutation switching means to disconnect power from said windings to allow the rotor to run down towards zero rotation, (c) Detecting means to indicate rotor position relative to said stator, and (d) Pattern reverse means operable in response to a signal from said detecting means when the rotor is in condition to be reversed to cause the control signals to cause commutation changes which cause said rotor to change direction without testing for rotor direction.

In a still further aspect the invention consists in a method of cyclically controlling the supply of power to an electric motor having a rotor said method including the steps of starting rotation of said rotor in one direction setting an initial "power on" time during which power is applied to said motor, switching off power at the end of said initial "power on" time, causing the rotor to slow until in a condition to be reversed, checking the ramp down time the rotor takes to slow to a condition ready for reversal, causing reversal of direction of rotation of said rotor, as soon as the rotor is in condition to be reversed, and repeating the said steps as desired.

In a still further aspect the invention consists in a method of cyclically controlling the supply of power to an electric motor having a rotor said method including the steps of setting a desired time of rotation of said rotor in one direction starting rotation of said rotor in said one direction setting an initial "power on" time during which power is applied to said motor, switching off power at the end of said initial "power on" time, causing the rotor to slow until in a condition to be reversed, checking the ramp down time to rotor takes to slow to a condition ready for reversal, causing reversal of direction of rotation of said rotor, applying power to said rotor for a further "power on" time which is such that said further "power on" time plus said ramp down time equals said desired time, switching off power to said rotor at the end of said further "power on" time, again checking the next ramp down time reversing direction of the rotor to said one direction when said rotor is in condition for reversal and applying power to said rotor for a still further "power on" time which is such that said still further "power on" time plus said next down ramp time equals said desired time and repeating the cycles for a desired length of time, adjusting the "power on" time at desired intervals of time so that the adjusted "power on" time for a further half cycle plus the down ramp time for a previous half cycle equals said desired time.

In a still further aspect the invention consists in a method of electronically cyclically controlling the supply of power to an electric motor said method including the steps of setting a desired speed of rotation of the rotor of the motor, sensing the resistance to rotation of the motor and using responses from the sensing means to actuate adjustment means to adjust the power supplied to the motor to change the motor speed towards said desired speed and then operate the motor within a range of speeds at or close to said desired speed of rotation, switching off the supply of power to the motor, stopping its rotation and then repeating the cycle of operations with the motor running in the reverse direction.

In a still further aspect the invention consists in an electrical control means for cyclically controlling the supply of electrical power to an electric motor having a rotor said control means comprising switching means to switch power to said motor on and off, coasting timing means to time the length of time said rotor takes from the time power is switched off thereto to the time when said rotor is in condition for reversal of direction of rotation, and reversing means to reverse the direction of said rotor when said rotor is in condition for reversing and to switch on said switching means when reversing is to be effected.

In a still further aspect the invention consists in an electronic control means for cyclically controlling the supply of electrical power to an electric motor said electronic control means including setting means operable to set a desired speed of rotation of the rotor of said motor, sensing means to sense resistance to rotation of the motor and adjustment means responsive to said sensing means to adjust the power supplied to the motor to accelerate said motor towards the desired speed and to then operate the motor within a range of speeds at or close to said desired speed of rotation, switching means to switch off the supply of said motor after a desired time and reversing means operable after the motor has substantially stopped to cause the cycle of operating to be repeated with the motor running in the reverse direction.

In a still further aspect the invention consists in an electrical control means for cyclically controlling the supply of electrical power to an electric motor having a rotor said control means comprising switching means to switch power to said motor on and off, power timing means to time the length of power time when power is switched on, coasting timing means to time the length of time said rotor takes from the time power is switched off thereto to the time when said rotor is in condition for reversal of direction of rotation, stroke timing means to time the stroke time during which said rotor rotates between reversals setting means to set said stroke timing means to a desired stroke time, algebraic subtracting means to algebracially subtract a previous coast time from said stroke time to arrive at a time setting for said power time and reversing means to reverse the direction of said rotor when said rotor is in condition for reversing and to switch on said switching means when reversing is to be effected.

In a still further aspect the invention consists in a method of operating a laundry machine having a container for a wash load of soiled fabrics in wash water and a reciprocable agitator in said container and an electric motor driving said agitator, said method comprising the steps of starting rotation of said motor in one direction setting an initial "power on" time during which power is applied to said motor, switching off power at the end of said initial "power on" time, allowing the motor to slow down until in a condition to be reversed, checking the time between the power off condition and a condition when the rotor is in condition to be reversed causing reversal of direction of the rotor as soon as the motor is in condition for reversal and repeating the said steps as desired.

In a still further aspect the invention consists in a method of operating a laundry machine having a container for a wash load of soiled fabrics in water and a reciprocatable agitator in said container, an electric motor driving said agitator, setting means to set a desired rate and amplitude of time and/or angle of oscillating rotation of said agitator an electronic control means controlling the supply of electrical power to said electric motor in one of a plurality of sequences, said method including the steps of setting a selected one of said plurality of sequences so that said agitator is driven in oscillating rotation during a wash phase in a sequence of washing operations, sensing the resistance to oscillation of said agitator due to the wash load in said container and adjusting the power supplied to said electric motor so that a selected rate of removal of soil from said soiled fabrics is substantially achieved.

In a still further aspect the invention consists in a laundry machine including a container for a wash load of soiled fabrics in water a reciprocatable agitator in said container an electric motor driving said agitator, setting means to set a desired rate and amplitude of oscillating rotation of said agitator, electronic control means controlling the supply of electrical power to said electric motor in one of a plurality of selected sequences so that said agitator is driven in oscillating rotation during a wash phase, selecting means for selecting a desired one of said sequences so that a washing action selected from such as delicate, regular, heavy duty, wool, and permanent press washing actions is to be effected by the machine said electronic control means including sensing means to sense the resistance to oscillating rotation of said agitator due to the wash load in the container and adjustment means responsive to said sensing means to adjust the power applied to said electric motor so that a washing action results such that a selected rate or removal of soil from said soiled fabrics is substantially achieved.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Preferred forms of the invention will now be described with reference to the accompanying drawings in which, FIG. 1 is a block diagram of an electronic control circuit to control an electronically commutated motor driving an agitator and spin tub of a clothes washing machine, FIGS. 2 and 3 illustrate EMFs in windings with the rotor rotating clockwise in relation to FIG. 2 and counterclockwise in relation to FIG. 3, FIG. 4 is a diagram showing motor stator windings, and electronic power commutation circuitry, FIG. 5 is a circuit diagram of a voltage digitizing circuit used in the invention.

FIGS. 12 to 16 are flow diagrams showing various phases of operation of the control circuit of FIG. 1.

Figure 19:
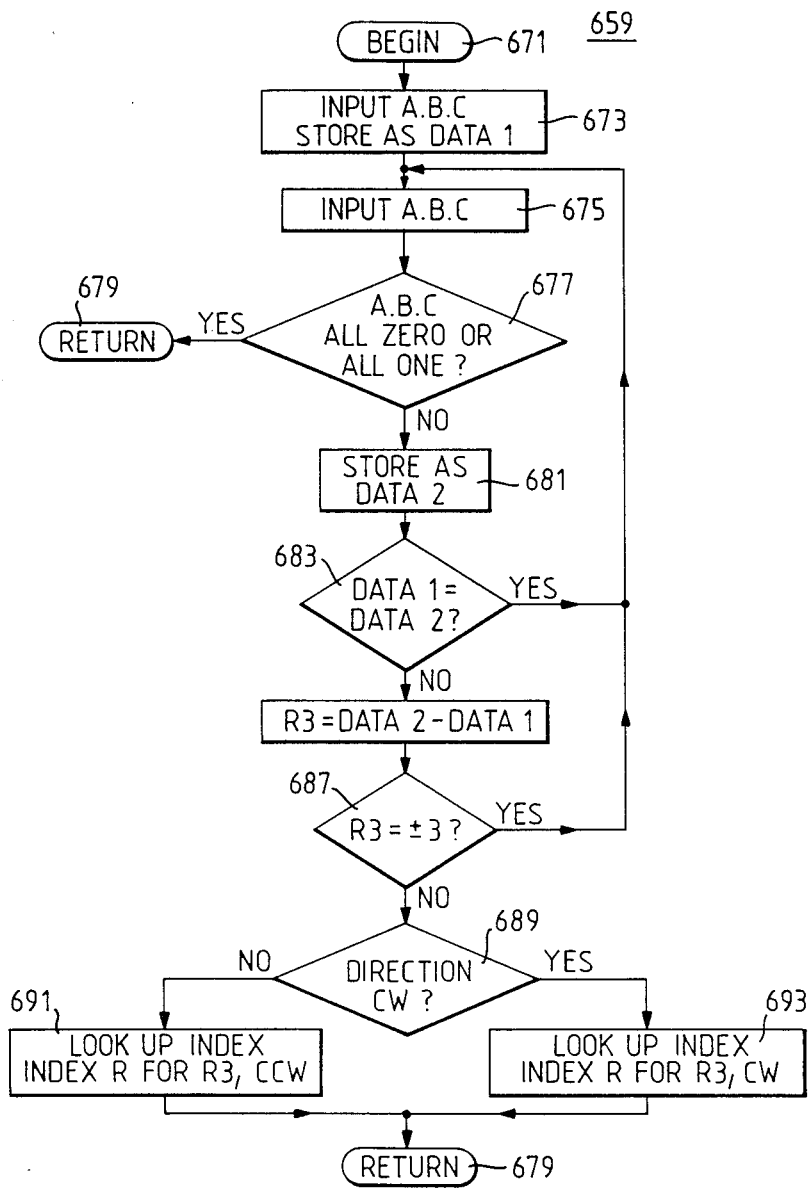

FIGS. 17, 18 and 19 are figures repeated from a Boyd & Muller U.S. Pat. No. 4,540,921 to provide background to the present invention.

This invention relates in general to a laundry machine with a cabinet a wash water container in its cabinet, a spin tub in the container reciprocating agitator in the spin tub and a motor for driving the agitator in the spin tub. Specifically it relates to sensing means for sensing the load on the agitator and adjusting means operating in response to signals from the sensing means to adjust the power by adjustment of the profile of velocity to the agitator as indicated by a velocity/time graph such that soil removal and washing activity remain substantially constant according to a desired setting for different loads.

Laundry machines are required to wash a wide variety of fabrics and garments. Different clothes and fabric types require different treatment to achieve an appropriate wash action. In general, with vertical agitator washing machines, as agitator velocity is increased, soil removal and wear and tear also increase. An appropriate balance between soil removal and wear and tear is necessary. It is a major objective of laundry machines to wash each type of fabric with an agitator action appropriate to the load type and size. For example, clothes which fall into the broad category of "delicates," often synthetic in origin, or fragile items which are susceptible to damage during the wash but which are typcially only slightly soiled, require gentleness of wash action with less emphasis on soil removal, whereas "regular" items such as cottons which are strong when wet can withstand a more vigorous wash action.

Conventional vertical axis laundry machines employ various types of transmissions to convert rotary motion provided by an electric motor into oscillatory motion at the agitator for their wash mode. Such motors are generally of essentially constant speed types. Therefore to provide wash actions suitable for loads ranging from delicate garments to heavily soiled hard wearing garments requires multiple gearing or switched speed motors each of which is costly. Further, as wash load is increased towards rated capacity for a constant amount of water, mean soil removal typically decreases and mean gentleness increases. Variance of soil removal and gentleness also increaese, indicating less uniformity of wash action throughout the wash load. Therefore it is difficult to maintain good wash performance with laundry machines of this type under varying load conditions.

The use of agitator drive systems such as disclosed in the John Henry Boyd Australian Patent Specification AU-A-85 -183/82 AND THE FISHER & PAYKEL United Kingdom Patent UKN2095705 wherein the agitator may be directly driven by an electronically controlled motor either with or without a simple speed reduction unit and oscillatory rotation is enabled by periodic reversal of rotation of the motor provides opportunity for varying the speed and rate of reversal of the agitator to obtain the appropriate balance between soil removal and wear and tear for each category of load. However the problem of variation of soil removal and also wear and tear with load size still remains.

In a first aspect of the invention the following describes apparatus to carry out an oscillatory rotation of the agitator during a washing phase of the cycle of operations of the washing machine and then on command to spin the spin tub in a spin phase of the washing cycle, and is principally concerned with the agitation cycle.

In a further aspect of the invention, later in this specification a detailed description is given of preferred forms of sensing means to sense the wash load in the laundry machine, correcting means to correct for velocity variations, adjusting means to adjust the power applied to the agitator by modification of the profile of velocity as indicated by a velocity/time graph, and setting means to alter the stroke angle of the agitator such that soil removal and wear and tear such that wash performance remain substantially constant for a particular setting with variation of load size.

The preferred form of the invention is an improvement on the disclosure in the Boyd and Muller U.S. Pat. No. 4,540,921 the specification and drawings of which are incorporated by reference herein.

For assistance in the full understanding of the present invention excerpts from the Boyd and Muller U.S. Pat. No. 4,540,921 are inserted herein but no claim is made to the subject matter desribed and claimed in that Specification.

Figure 1:
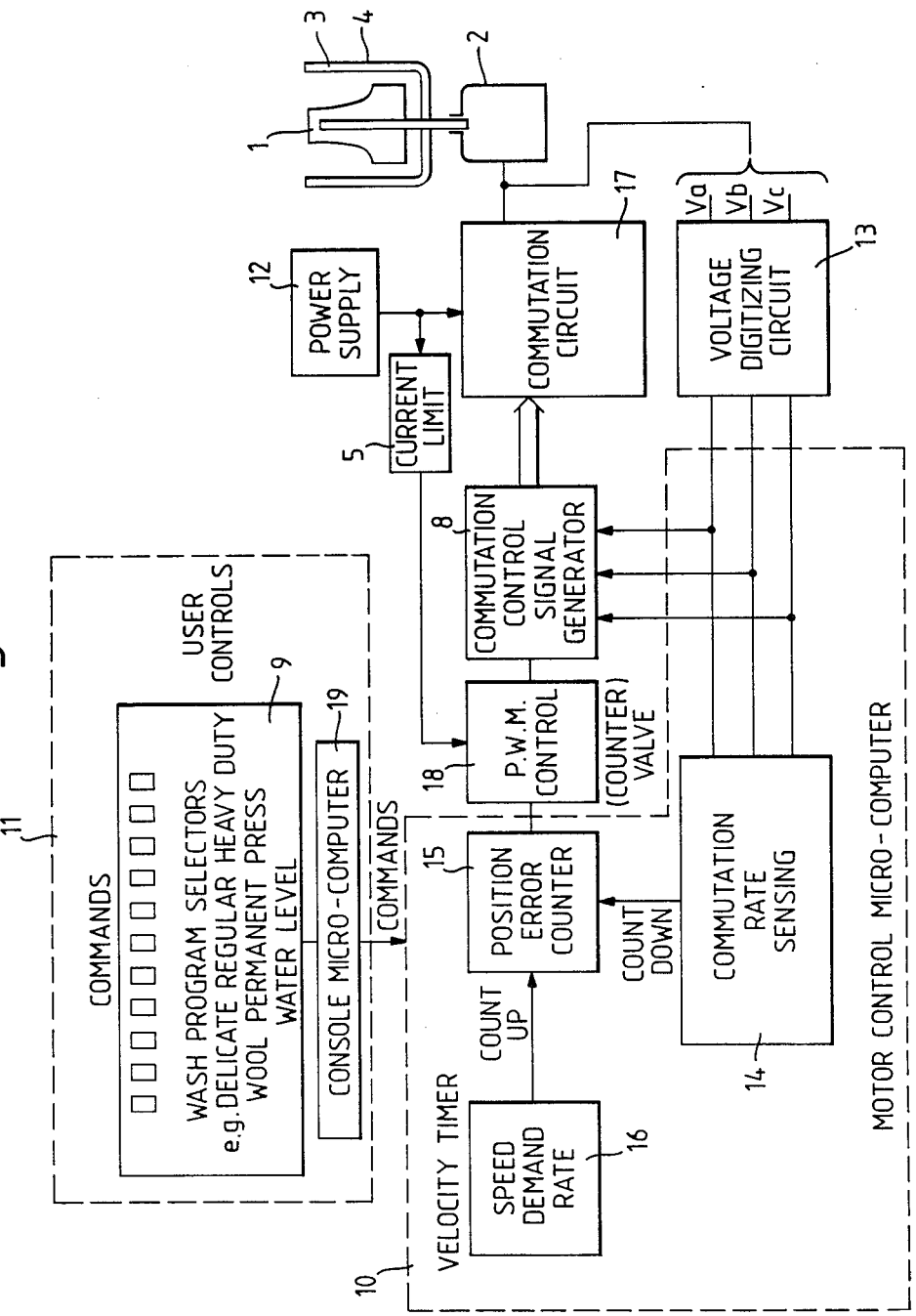

Referring to FIG. 1 of the drawings,

An electronically commutated motor (ECM) 2 is described in detail in the Boyd/Muller U.S. Pat. No. 4,540,921.

The ECM 2 constitutes a stationary assembly having a plurality of winding stages adapted to be selectively commutated, and rotatable means associated with that stationary assembly in selective magnetic coupling relation with the winding stages. The winding stages are commutated without brushes by sensing the rotational position of the rotor as it rotates within the stationary assembly. DC voltage is selectively applied by commutation circuit 17 to the winding stages in preselected orders of sequences leaving at least one of the winding stages unpowered at any one time while the other winding stages are powered in response to a pattern of control signal from voltage digitizing circuit 13.

The control apparatus comprises a general purpose microcomputer 10 eg an intel 8049 which receives commands for example from a console 11 having a series of push buttons or other user operable controls 9 and the microcomputer 10 stores patterns of signals which feed through a pulse width modulation control means 18 and a commutation control signal generator 8 (which are described in more detail later) to a three phase power bridge commutation circuit 17. The necessary power supplies are fed by a DC Power supply 12. In addition, signals are fed from a winding of the ECM is unpowered when other windings in the stator of the ECM are under power. This will be explained further later. Signals from the motor windings are fed to a voltage digitizing circuit 13, as described in the Boyd Muller Specification and below in relation to FIG. 4 of this specification, and are thence supplied to the microcomputer 10. Power switching circuits also feed through a current sensing circuit 5 to the microcomputer 10. A loop position error indicator 15 and a speed demand rate velocity timer 15 are provided and a commutation rate sensing device 14 but any other rotor speed and position varying device may be used as will be explained further later. A pulse width modulation control circuit 18 is provided.

In broad terms a clothes washing machine according to the present invention when operated to cause washing, functions as follows.

The operator selects a desired set of washing requirements by operating push buttons controlling its console microcomputer. As a result the console microcomputer sends a series of data values to the motor control microcomputer 10 and these are placed into registers (memory locations) of the same time, in the motor control microcomputer 10. Data transmitted from the console is broken up into 3 groups:

Group 1 contains the command words:
00H-BRAKE
01H-WASH
02H-SPIN
03H-TEST
04H-MODIFY
05H-STATUS
06H-STOP
07H-PUMP
Group 2 contains error codes:
08H-PARAMETER range error detected
09H-PARITY error detected
0AH-COMMAND error detected Group 3 contains parameter data:
0BH to 7FH The motor control microcomputer program knows which group to expect during each communication, therefore if the program has got out of step with the console in any way this will be picked up as a range error.

However due to this data structure some data in group 3 may be outside their working range so within the listing some parameters are offset after they have been received so that they fall within the correct value to be used within the program.

To maintain function overviews, at the beginning of the wash cycle the console microcomputer 19 controls the filling of the bowl. While the bowl is filling, a spin command is sent to the motor control microcomputer. The spin speed is very low, approximately 70 rpm, and its main purpose is to mix the soap powder while the bowl is being filled. Once the bowl is filled the console then sends a WASH command to the motor controller 10 to start the agitate cycle. This agitate cycle starts from rest, ramps up to speed, maintains this speed for a predetermined time and then coasts to a stop all within one forward or reverse cycle of the agitator. Once the agitator has stopped the process is repeated in the opposite direction thus producing an agitating motion. The console microcomputer 19 determines all these parameters which determine what sort of wash is required eg. gently cycle, and is loaded into the motor controller 10 before the start of the cycle.

The motor controller 10 continually modifies these wash parameters to account for the load in order to maintain the most effective dirt removal to gentleness ratio. Because of the agitating motion the load is shuffled around the bowl and this affects how fast the agitator ramps to speed and how long it takes to come to a stop at the end of the stroke. Therefore to maintain constant wash effectiveness these parameters are monitored and modified each stroke cycle to maintain the ideal conditions requested by the console microcomputer.

The motor controller 10 will continue this action until it receives another command from the console microcomputer. In a little more detail, the wash mode runs as follows.

On receiving a "WASH" command a jump is made to the WASH routine. Low speed windings of the motor are set and a brake is set off. The routine then waits for the Console microcomputer to send the wash cycle parameters, ie:
(1) TSTROKE The time for rotation of the agitator in one direction.
(2) WRAMP The time it takes to reach speed from rest.
(3) ENDSPD The velocity which the agitator must reach after the wash ramp time is up.

When these have been placed in the appropriate registers they are then checked for errors. Checks for other errors are also made including a check to make sure the motor is stationary.

A routine now sets LORATE=ENDSPD=ACCSPD. LORATE is the motor speed, ACCSPD is the speed that the motor must reach to obtain the correct wash ramp rate. ACCSPD may become greater than ENDSPD to achieve the correct acceleration ramp.

As is explained in more detail later, the speed rate timer RATETMR used in the timer interrupt routine for the speed reference count is loaded with the count set in LORATE previously.

The position error counter 15 is cleared and current trip and pattern error circuits are reset. In the wash mode the program bypasses the spin cycle routine.

At this point the plateau time, TFLAT, is calculated from the original information sent by the Console microcomputer. To do this it sets the coast time at 180 mS. This is a time chosen which guarantees that the motor will have coasted to a stop with very little load. Thus the plateau time is calculated:

TFLAT=TSTROKE−WRAMP−15 (180 mS time count)

using a long timer a count of 15 gives:
127×96 uS×15=180 mS (approx).

The routines up to this point have only been setting the wash parameters for the first stroke. The following values as referred to above, are set in the random access memory in the motor control microcomputer 10:

TSTROKE total stroke time, ie. from rest to peak speed and to rest again.
WRAMP time to full speed
ENDSPD full speed count
LORATE (set at ENDSPD) speed rate
ACCSPD (set at ENDSPD) acceleration rate
ALGFLG (set FALSE) end of ramp flag
ENDFLG (set FALSE) plateau time flag
SLECTR position error counter
RATETMR (set at LORATE) sets speed reference to speed loop error counter
TFLAT calculated from above parameters; time at maximum speed At this point the wash cycle can begin.

To actually set the motor into motion we must first set bit pattern pointers INDEXR and INDEX. For the wash cycle the direction of motion has arbitrarily been set at CCW (counter clockwise) for the first stroke, thus:

INDEXR=12D

INDEX=00 and the direction register DIRECT=01H for CCW. The wash ramp time WRAMP is loaded into a long timer for the beginning of the wash ramp cycle. Commutation now takes place, and the motor is started up.

After passing through the required time for or number of commutation routines the program ends. At the end of the agitate cycle the console microcomputer 19 will send a command to the motor controller microcomputer 10 to stop the agitate cycle and turn on the pump to drain the wash bowl before going into the spin mode.

As will be explained in more detail later, to enable motor reversal to be effected the invention requires to determine the position of the rotor during coasting of the rotor after power to the stator has been cut off. It will be clear however that this aspect of the invention cannot be put into use until the rotor itself has been operating under an electronically commutated sequence. Accordingly when the rotor has been stopped e.g. at the very start of a washing cycle it is necessary to start the motor when the position of the rotor is not known. Accordingly the technique described in the Boyd and Muller Specification in particular at page 55 is preferably used. In this technique the digitized voltages received from the voltage digitizing circuit are tested and as soon as complementary bits or logic levels in the proper test bit order have been sensed operations proceed to advance in sequence to commutate the winding stages. If complementary bits are not sensed in the predetermined proper test bit order in a predetermined time period operations take place to advance commutations in the sequence rapidly and force commutate the motor, thus causing the rotor to oscillate briefly. Thus if for example clockwise rotation is required and the sensing indicates that the rotor is starting to run in the counterclockwise direction, the rotor runs for a short distance in this direction (one or a few commutations occurring) until the force commutating is effected to cause it to run in the correct direction.

Figure 4:
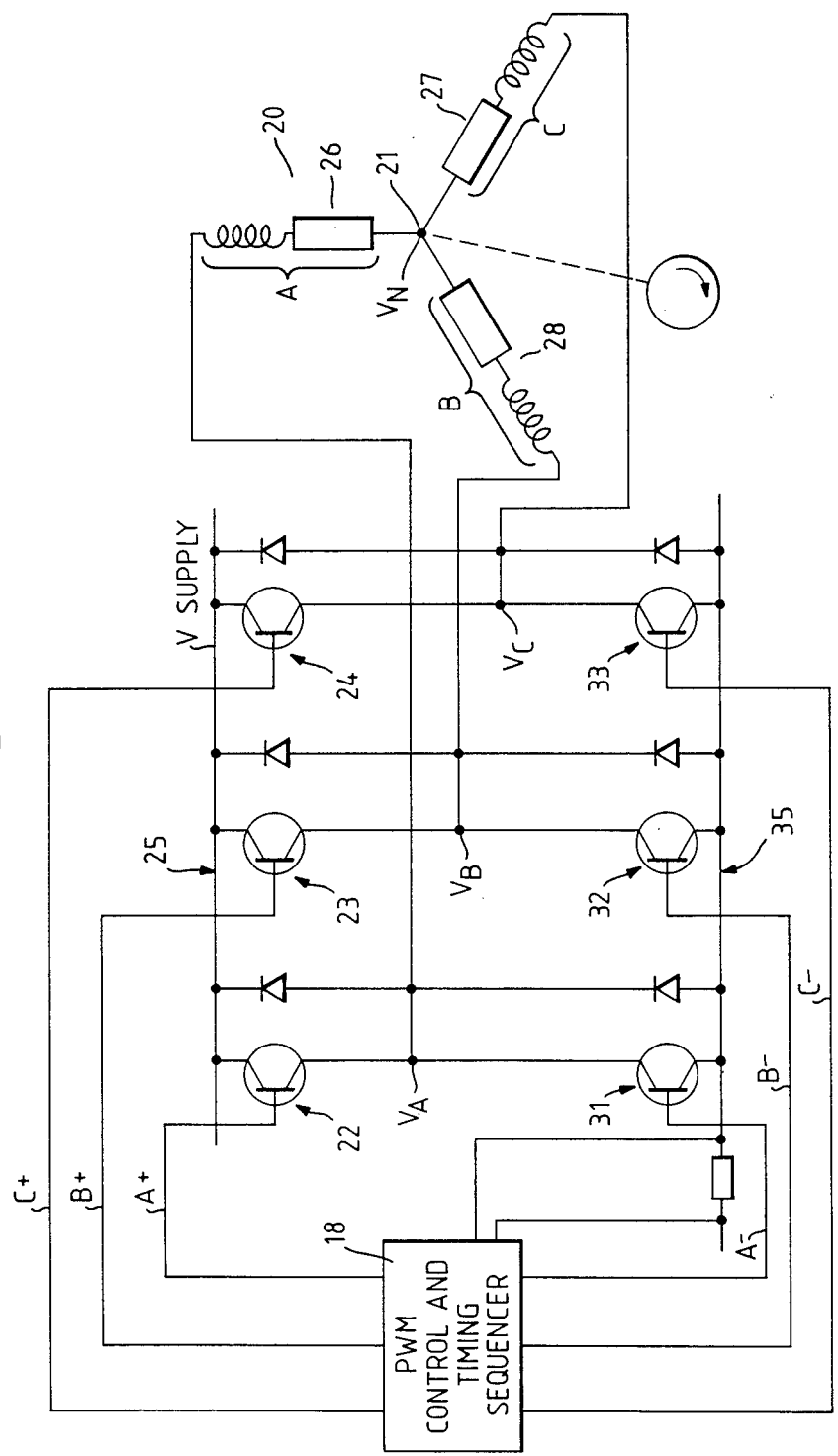

Thus referring to FIG. 4 there is provided a three phase motor 20 with a common point 21 and a switching bridge in which three switching devices 22, 23 and 24 connect the lower supply positive rail 25 to the ends of the windings 26, 27 and 28 and three further switches 31, 32, and 33 connect the ends of the windings to the power supply negative rail 35. The upper switches 22, 23 and 24 may be referred to as the A+, B+ and C+ switches and the lower switches 31, 32 and 33 may be referred to as the A−, B− and C− switches.

When the motor is stationary there is no information as to the position of the rotor so it is not known as to which pair of switches to turn on to get the rotor to rotate in the correct direction so a selected upper and lower switch are turned on. Statistically there is a 50% chance the rotor will rotate in the correct direction and a 50% change that it will rotate in the incorrect direction. An algorithm is provided in the microprocessor 10 that once power has been applied senses whether the motor is going in the correct or the wrong direction and in the event that the rotor is rotating in the wrong direction the alogrithm advances commutation signals quickly through the sequence of commutations until the correct sequence is adopted and the rotor synchronizes with the commutated supply and is now running in the right direction. It may take three or four switchings or more to synchronize the rotor and so with the starting algorithm 50% of the time it will start correctly and will just run into synchronism and 50% of the time it will start in the wrong direction and then stop and recover and then come back in the right direction. Thus with this arrangement every time the direction of the motor is reversed then if the present invention as will be described further later is not used then the motor is allowed sufficient time to coast to zero and then is started up using this starting algorithm. This start up algorithm is described in Boyd & Muller 4,540,921 more fully at col 8 line 23 et seq and col 23 line 57 at seq and col 24 line 43 to col 26 line 44. There must be some random initial rotation ie. some oscillation of the rotor and there must be time to start correct direction of rotation.

A random start means that the rotor will start in the wrong direction in 50% of all starts. Start up algorithm restores the correct direction of rotation in a time dependent on the initial rotor position, the pair of switches first energized and the motor load.

With a three phase 8 pole ECM as described by Boyd and Muller there are 24 commutations per rotor revolution. With an 8 to 1 coupling ratio between motor and agitator (e.g. by belt and pulley arrangement) and typical agitator stroke angles of 145° to 250° of arc and acceleration times of 120 to 200 milliseconds respectively the motor is required to accelerate to speed in the range of 7 to 30 commutations. At startup the motor may require 1 to 2 commutation angles to restore correct rotation, a significant proportion of the acceleration period. The resultant effect is a delay in reversal followed by rapid acceleration to speed often with some overshoot.

Gentleness of wash action in the washing machine is related to the acceleration of the agitator. Hence erratic reversal decreases gentleness. Further, delays in reversals also can reduce the rate of soil removal. The overall effect is reduction in desired wash performance.

Thus according to the present invention a more positive acceleration and consequently a more positive rate of soil removement and rate of wash action is achieved by monitoring the speed and position of the rotor while the rotor is coasting. When the position of the rotor is monitored down to a position in which it is in condition for reversal, power is switched to the motor such that torque is generated to cause the rotor to reverse direction preferably within a single commutation angle and allow the motor to run in the opposite direction without reverting to the start up algorithm.

Accordingly the rotor may be accelerated up to speed and maintained at speed using the power switching sequence as described in Boyd & Muller 4,540,921 referring to tables 1 and 2 therein and in particular at col 6, lines 24 to 39 where the following passage appears:

"The winding stages of motor M as explained for instance in the aforementioned Alley U.S. Pat. No. 4,250,544 are commutated without brushes by sensing the rotational position of the rotatable assembly or rotor 15 as it rotates within the bore of stator 13 and utilizing electrical signals generated as a function of the rotational position of the rotor to sequentially apply a DC voltage to each of the winding stages in different preselected orders or sequences that determine the direction of the rotation of the rotor. Position sensing may be accomplished by a position detecting circuit responsive to the back EMF of the ECM to provide a simultated signal indicative of the rotational position of the ECM rotor to control the timed sequential application of voltage to the winding stages of the motor."

The present invention is concerned with the monitoring of speed and position of the rotor while coasting and using this information to reverse the motor preferably in a single commutation.

Figure 2:
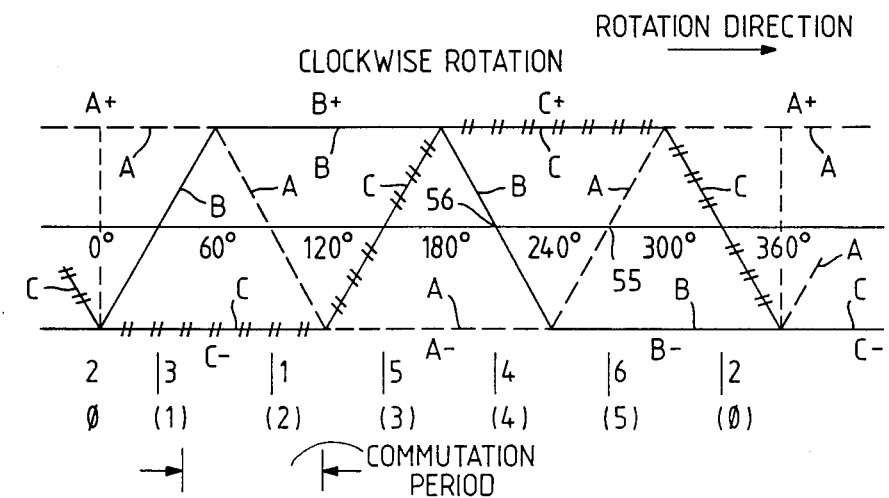
Figure 3:
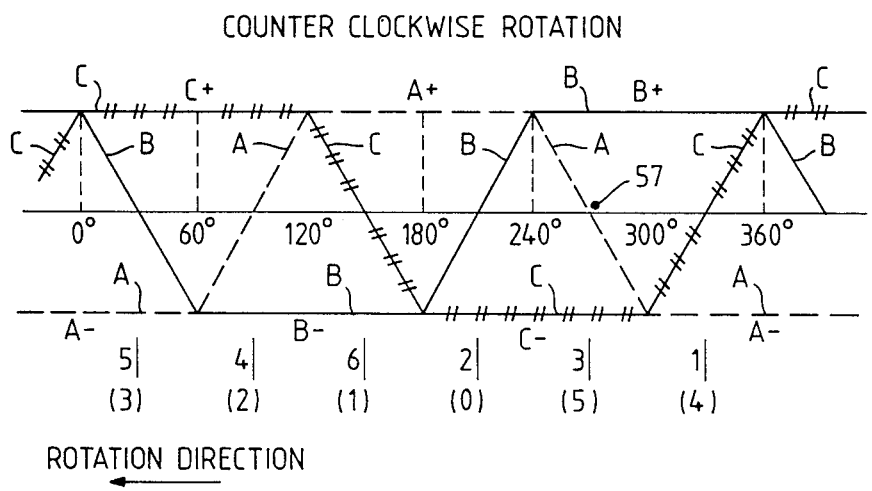

If the rotor to the motor is rotated and voltage measurements taken at the ends of the phases with respect to the star point 21 i.e. the centre of the three phase windings, EMFs will be generated and in FIGS. 2 and 3 such EMFs have been plotted. The Figures illustrate a single electrical revolution of the rotor in degrees and essentially show the wave forms of a three phase generator with the exception that the wave forms instead of being sinusoidal are trapezoidal. The three phases have been indicated by the letters A (pecked line), B (full line) and C (slashed line). For example in B phase it will be seen that in FIG. 2 the EMF goes from a maximum negative at zero degrees through zero voltage to a maximum positive, stays at a maximum positive for 120° then goes from maximum through zero voltage to maximum negative stays at maximum negative for 120° and then starts to rise again from zero degrees. It will be seen that in FIG. 2 the sequence (which represents rotation in a clockwise direction) has a different sequence of EMF generations as compared with FIG. 3 which represents a counterclockwise direction of rotation. Referring now to FIG. 4, applying voltages to the windings and assuming that winding 26 is A, winding 27 is C and winding 28 is B and that if we wish to have power on the motor at zero degrees such that we have a maximum EMF across the motor and thus maximum torque in clockwise direction, switches 22 (A+) and 33 (C−) would be switched on, connecting power from the positive rail 25 through switch 22 to the A phase windings 20 through the neutral point 21 and the C phase windings 27 through switch 33 to negative rail 35. Thus referring again to FIG. 2 with the notation therein indicated to obtain maximum torque in the motor the connections would be A+ and C− to the 60° angle and then B+ and C− at the 120° angle to B+ and A− to 180° angle then C+ and A− to the 240° angle, C+, B− to the 300° angle, A+ to B− to the 360° angle, the sequence commencing at A+ and C− again. Thus there is a sequence of six different patterns and each goes to 60° of angle of rotation giving 360° in rotation. Referring to the tables herein, Table I summarises the sequence of control signals required for each step in the sequence described above. Referring to Table I it will be seen that the rows numbered 5 down to 0 correspond to the sequence of digital signals required to control the A+, B+ and C+ switches 22 to 24 and the A−, B− and C− switches on or off. A 0 in the table indicates that the switch is turned on and a 1 in the table denotes that the switch is turned off. This is a negative notation because of the manner of operation of the microcomputer. Two further control lines are used to control whether or not the upper or lower switches are pulse width modulated to control motor current. Thus the microcomputer 10 is programmed to contain the pattern shown in Table I. The six columns from left to right for each switch control line show each step in the sequence described above with each step indexed from 0 to 5 in the row marked INDEX. Counterclockwise rotation is obtained by applying the control signals of Table 2 which is the reverse of the sequence of Table 1. The value of INDEX therefore is a reference of position in the commutation sequence for each table at any time. At each commutation INDEX is incremented by 1 until a maximum value of 5, then reset to 0 to continue the cycle. In each table another index is referenced "INDEXR" as mentioned in connection with flow diagrams discussed below. The INDEXR row has entries which are unique to each pattern in the sequence and different for Table I and Table 2 so that a given pattern is uniquely identified for clockwise and counterclockwise rotation. Determination of the time for commutation is explained in detail in Boyd/Muller and excerpts are given later. Now during coasting (as described in the Boyd/Muller Patent) transitions in signals from comparators monitoring EMF signals contain position information. To repower the motor while still spinning such that the motor continues to run in sequence in the same direction requires that values of INDEX and INDEXR be computed such that correct switching sequence is initiated as explained in Boyd/Muller. In this specification is explained methods of repowering the motor such that the motor reverses direction by determining safe speeds for reversal and computing suitable values of INDEX and INDEXR such that correct switching sequence for reverse direction is initiated, preferably in a single commutation period.

Figure 5:
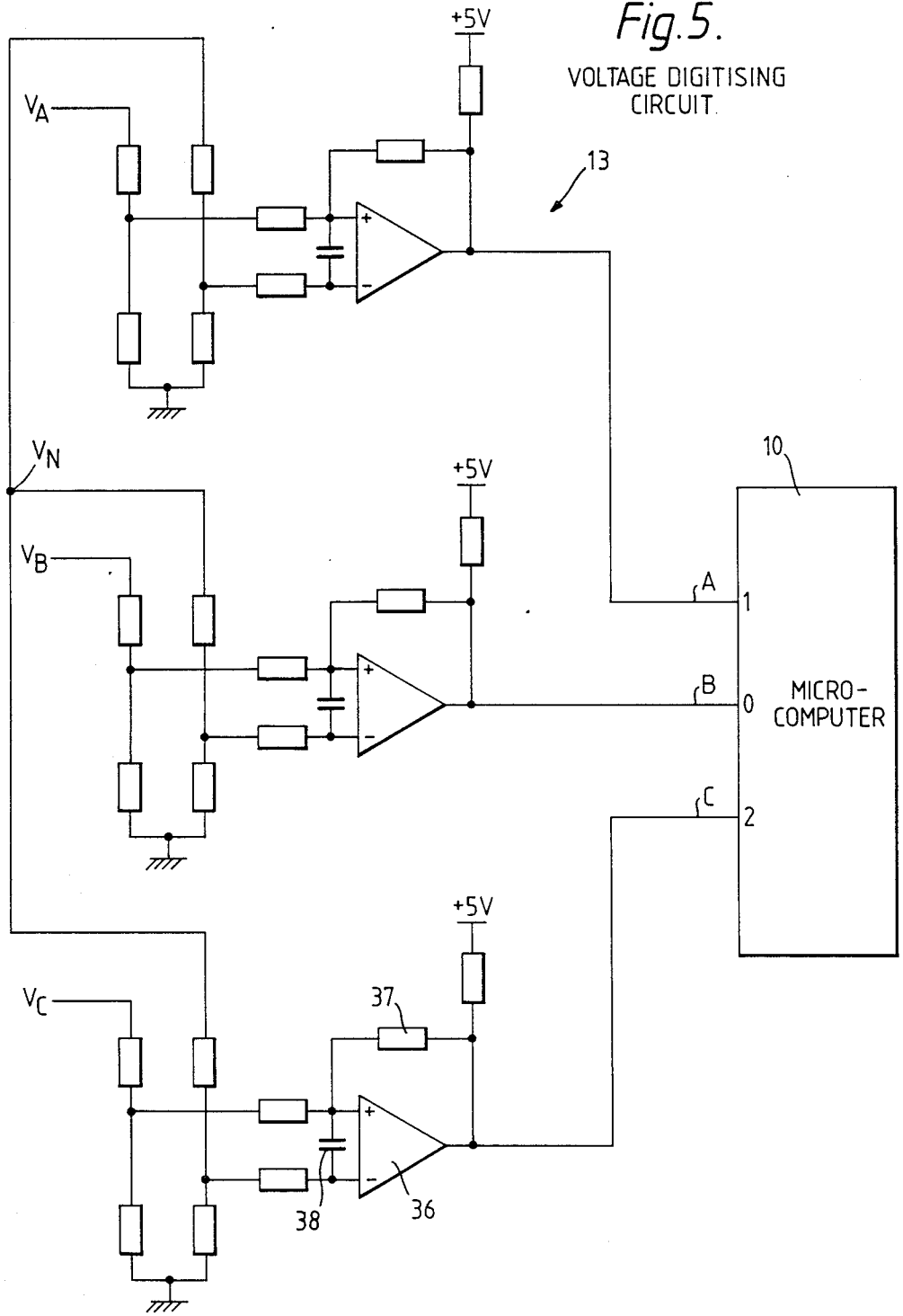

It will be noted from the diagram of FIGS. 2 and 3 that for any 60° commutation interval in the unpowered phase the EMF is going from the maximum in one sense through a zero to a maximum in the other sense and it is that phase which is going to be turned on in the next commutation interval so that the microcomputer can determine when to turn that phase on by determining when that phase crosses through the zero point. This is effected by the use of voltage comparators for example by circuitry as shown in FIG. 5 in which VA is a measure of this voltage to zero volts appearing in winding 26, VB is a measure of the voltage to zero volts in winding 28 and VC is a measure of the voltage to zero volts in winding 27. When for example a voltage VC is greater than the voltage VN on the neutral point N (21) FIG. 4 the output of the comparator 36 will be high. When the voltage is less than the voltage VN at the neutral point, the output of the comparator 36 is low and the output of these comparators is fed directly into the microcomputer 10 which reads in the comparatives. It is to be noted that the output is comparative when the circuitry is looking at the comparator for the unused winding at any one time which will change sense when the EMF in that winding crosses zero. The microcomputer is then informed that it is almost time to commute in accordance with the present invention with each successive zero crossing in a sequence, if there is a low to a high transition, the next one is a high to a low transition, then low to high, high to low, and continuing in that way. Thus the microcomputer knows where each winding is in the sequence and it knows which of the comparatives to look for for the next EMF sensing. The microcomputer looks for a transition and it also knows whether it should be low going high or high going low so that it can compute from the sequence where the rotor is in relation to the windings and what the next indications will be from the comparatives. Accordingly the microcomputer follows either Table 1 or Table 2 depending on the direction of rotation and cycles continue with the correct switches being turned on at the correct time.

In the A,B, & C circuits of FIG. 5, as shown with reference to the C circuit resistance 37 and capacitance 38 provide a filter effect reducing the sensitivity to transients.

Now during coasting, the EMFs are still present in the motor and thus zero crossing transitions will also still be present and result in signals being sent by the comparators to the microcomputer, these signals being digitized by the digitizing circuit 13, FIG. 5.

The Boyd and Muller Patent describes operations for repowering an ECM after coasting under control of the apparatus therein described and is repeated with reference to FIGS. 17, 18 and 19 as follows, see col. 30 line 36 and et seq of Boyd & Muller Patent.

"In FIG. 17 the relaying routine of step 588 is shown. Operations commence with BEGIN 651 and proceed to produce the OFF pattern (all ones on lines 62) at step 653 to turn off the motor M. At step 655 microcomputer 61 issues a Low on line DB6 (FIG. 3) producing a High on line H from NAND gate 157, and causing relay 147 in high-low speed circuit 41 to switch from the low speed connection arrangement to a high speed connection arrangement. Microcomputer 61 waits for 10 milliseconds as by any suitable routine, such as counting from a preset number down to zero, in step 657 in order to permit the relay 147 armature 155 to come to rest in the high speed position. However, during this waiting period, the rotor 15 of motor M has, or may have, rotated through a significant angle for commutation purposes. Accordingly, at step 659 a routine is executed for determining the value of INDEX from the sensed digitized voltages on comparator outputs A, B, and C of FIG. 6 when the winding stages are temporarily unpowered, and resuming producing patterns of digital signals on lines 62 beginning with the pattern of digital signals (and thus a corresponding set of control signals from control signal generator 51) identified by the value of INDEX so determined. The digitized back emfs for three wye-connected winding stages S1, S2 and S3 are illustrated in FIG. 18 and tabulated in Tables III and IV for clockwise and counterclockwise rotation respectively.

In FIG. 18 and in the first three rows of Tables III and IV, the logic levels of the digitized voltages on input lines 0, 1 and 2 of microcomputer 61 (FIG. 1, 4,540,921) are shown when rotor 15 (FIG. 2 4,540,921) is coasting. Each of the six columns shows the logic levels of the digitized back emfs present at any given time. As the rotor turns, the logic levels of a given column are replaced by the logic levels in the column next to the right. When the right-most column is reached, the logic levels begin again in the left-most column is reached, the logic levels begin again in the left-most column, cycling through the columns as before. FIG. 18 shows superimposed on the logic zeros and ones a waveshape of the digitized back emfs on the input lines 0, 1 and 2. The digitized back emfs at any one time and their changes to other values at other times bear sufficient information to permit sensing the position of the turning rotor 15 and to identify the proper point in sequence for beginning commutation of such turning rotor and for resuming commutation whenever commutation is interrupted or discontinued. Accordingly, the index-determining operations of step 659 as described in further detail in FIG. 19 are used in relaying routine 588 in the preferred embodiment, and are used in other embodiments of the invention whenever it is desired to begin commutation in sequence.

In FIG. 19 operations commence with BEGIN 671, and microcomputer 61, (FIG. 1 4,540,921) inputs all the lines 0, 1 and 2 of port P1 at once by masking with ALLHI=07 (binary 00000111). As a result there resides in microcomputer 61 (FIG. 1 4,540,921) a three bit binary number having binary digits corresponding to each of the digitized voltages on the three lines. This binary number is designated DATA1 and stored in step 673. Then at step 675, microcomputer 61 inputs all the lines 0, 1 and 2 of port P1 again in search of digitized voltages corresponding to an adjacent column of digitized voltages in FIG. 18.

The digitized voltages just obtained in step 675 are sorted and designated DATA2. In step 683, DATA1 is compared with DATA2. If they are the same number, (i.e. DATA1−DATA2=)) the rotor has not turned sufficiently to move to the adjacent rightward column in FIG. 18 and in the Table III or IV corresponding to the direction of rotation. When DATA1=DATA2 a branch is made back to step 675 to input another set, or instance, of digitized voltages until an instance of digitized voltages is found at step 675 which is different from DATA1. At step 685, the difference DATA2−DATA1 is computed.

When step 689 is reached, microcomputer 61 has stored values of DATA1 and DATA2 which are in adjacent columns of one of the Tables III or IV. Each Table III or IV lists values of R3, which is the difference DATA2−DATA1, in the column corresponding to the digitized back emfs in DATA1. Beneath a value of difference R3 in each of column of Table III or IV are values of INDEX and INDEXR. The values of INDEX and INDEXR are precisely the values for identifying the proper Table I or Table II and the proper column therein containing the digital signal pattern which microcomputer 61 can and does then produce to resume commutation of the winding stages at the proper point in sequence. (Beneath the tabulated value of R3 in Table III is an entry designated "Offset R3" which is a number calculated in the program listing of Appendix I for microcomputer table lookup purposes).

If the direction determined is counterclockwise, a branch is made from step 689 to step 691 for table lookup in a table in microcomputer 61 (FIG. 1 of 4,540,921) having the information found in Table IV in rows R3 and INDEX. When INDEX is found, INDEXR is reset by adding 12 to INDEX. If the direction determined is clockwise, a branch is made from step 689 to step 693 for table lookup in a table in microcomputer 61 (FIG. 1 of 4,540,921) having the information found in Table III in rows R3 and INDEX. INDEXR is reset as equal to INDEX when the direction is clockwise. After step 691 or step 693 is executed, RETURN 679 is reached.

The operations of FIG. 19 can be described more generally as follows. Microcomputer 61 (FIG. 1 of 4,540,921) identifies successive patterns of the control signals and of the digital signals of Tables I and II by values of an index designated INDEX. A value of the index is determined from the sensed digitized volages when the winding stages are temporarily unpowered. Microcomputer 61 (FIG. 1 of 4,540,921) resumes producing successive patterns of the digital signals which causes control signal generator 51 (FIG. 1 of 4,540,921) to generate successive patterns of the control signals in sequence beginning with a pattern of the digital signals and control signals determined from the sensed digitized voltages. The lookup table information stored in microcomputer 61 (FIG. 1 of 4,540,921) is a function, i.e. a predetermined correspondence between members of two sets of numbers. The sets of numbers involved here are values of INDEX on the one hand and values of the differences R3. Equivalently, Tables III and IV can be regarded as tabulating INDEX as a function of digitized back emf itself. It is also to be understood that there are a multitude of equivalent ways made known by the disclosure made herein, of setting up a function relating the digitized back emf information to some variable such as INDEX which can be used to determine the proper point for beginning in sequence when commutation begins again. When the successive patterns of digital signals and control signals are identified by values of an index, the index is advantageously determined as a function of a number represented by the sensed digitized voltages when the winding stages are temporarily unpowered, and microcomputer 61 (FIG. 1 of 4,540,921) resumes producing patterns beginning with the pattern of the control signals identified by the value of the index so determined. The index is determined as a first function of a number represented by the sensed digitized voltages when the winding stages are temporarily unpowered and the preselected sequence is for clockwise rotation of the rotatable means 15 (FIG. 1 of 4,540,921) and determined as a second function of the number so represented when the preselected sequence is for counterclockwise rotation, and microcomputer 61 (FIG. 1 of 4,540,921) resumes producing patterns beginning with the pattern of the control signals identified by the value of the index so determined. The value of the index is also determined as a function of the difference of first and second numbers represented by different instances of the sensed digitized voltages, and microcomputer 61 begins with the pattern of the control signals identified by the value of the index so determined.

The value of the index is determined as a function of the difference of first and second numbers represented by different instances of the sensed digitized voltages unless one of the numbers is in a set of predetermined numbers, such as 0 and 7, and microcomputer 61 begins with the pattern of the control signals identified by the value of the index so determined. A difference of first and second numbers are represented by different instances of the sensed digitized voltages is calculated and a value of the index is determined as a function of the difference unless the difference is in a set of predetermined numbers, such as 0, +3, and −3, and microcomputer 61 (FIG. 1 of 4,540,921) begins with the pattern of the control signals identified by the value of the index so determined. Microcomputer 61 (FIG. 1 of 4,540,921) in this way prevents sensed digitized voltages representing a number in a predetermined set, such as 1 and 7, from being used to determine the beginning pattern of control signals. Microcomputer 61 (FIG. 1 of 4,540,921) repetitively senses the digitized voltages while the winding stages are temporarily unpowered and determines the beginning pattern of the control signals as soon as a change occurs in any one of the sensed digitized voltages."

Table 3 herein is equivalent of Table III in the Boyd Muller patent.

It is to be noted that in Boyd/Muller when the motor is operated in the agitate mode to reverse motor direction a definite time is allowed for the rotor to coast to a stop and then random restarting is effected with a 50% chance that the rotor will start in the wrong direction necessitating adjustment of the commutation to reverse the rotor direction and accelerate to speed in the right direction. This gives irregular accelerations to the rotor and thus causes irregular washing action to result. Accordingly this invention involves a precise or defined method which may be implemented on a programed computer for finding where the rotor is and where the switching in the sequences will be. Thus with a transition the microcomputer calculates which switches should be on at any one time.

If we want to start at that time we apply power with those switches so set or indexed these tables and start applying power.

Timers are provided as follows:

SHORT TIMER, LONG TIMER, COMMUTATION TIMER

In this implementation an INTEL 8049 1-chip microcomputer is used for motor control microcomputer 10. It contains an 8 bit timer. This timer can be driven by either an external oscillator or directly from the ALE pulse which is divided by a factor of 32 before entering the timer (ALE=CLOCK/32). The microprocessor clock runs at 10 MHZ so therefore a (10 MHZ/15)/32=20.833 KHZ clock signal is applied to the timer. This provides a count every 48 microseconds in the timer and in operation the timer is loaded with a count of 2 thus providing an interrupt pulse every 96 microseconds. This interrupt rate provides the base timing to the motor controller.

On interrupt the program is forced to jump to a Timer Interrupt Routine. On entry to this routine the timer is reloaded with a count of 2 to provide the 96 microsecond base time.

This routine has two major functions:
(i) Decrementing Timer Register counts every 96 microseconds, and setting the appropriate timeout flag when the counts reach zero.
There are three timer registers used.
(a) Short Delay Timer
(b) Commutation Delay Timer
(c) Long Delay Timer.

The registers (a) and (b) are decremented each interrupt, therefore using a count of 01H to OFFH timers (a) and (b) can achieve time intervals of 96 microseconds to 24 milliseconds (ie. 256×96 microseconds). For extended time delays using register (c), an intermediate prescaler register which is initially set to 7FH (127) is decremented every interrupt. Only when the Prescaler Register reaches zero is the register (c) decremented. Therefore the long timer can achieve time intervals of 127×96=12 milliseconds to 127×256×96 microseconds=3 seconds. In order for the main program to use these time delays a count must be put into the appropriate Timer Register. The timer flag must then be tested periodically to see whether the time is up.

(ii) The second function of this routine is to provide the Speed Demand Rate function 16 of FIG. 1. ie. to provide a count rate to position error counter 15 equal to the required motor commutation rate. This is achieved by setting the Speed Rate Timer Register (RATETMR) equal to the count for the period of the required commutation rate eg. ACCSPEED, ENDSPD. Thus on every timer interrupt the RATETMR is decremented and once it is zero the Position Error Counter 15 is decremented. The RATETMR is automatically reloaded with the correct count and the cycle repeats for continuous operation.

Figure 6:
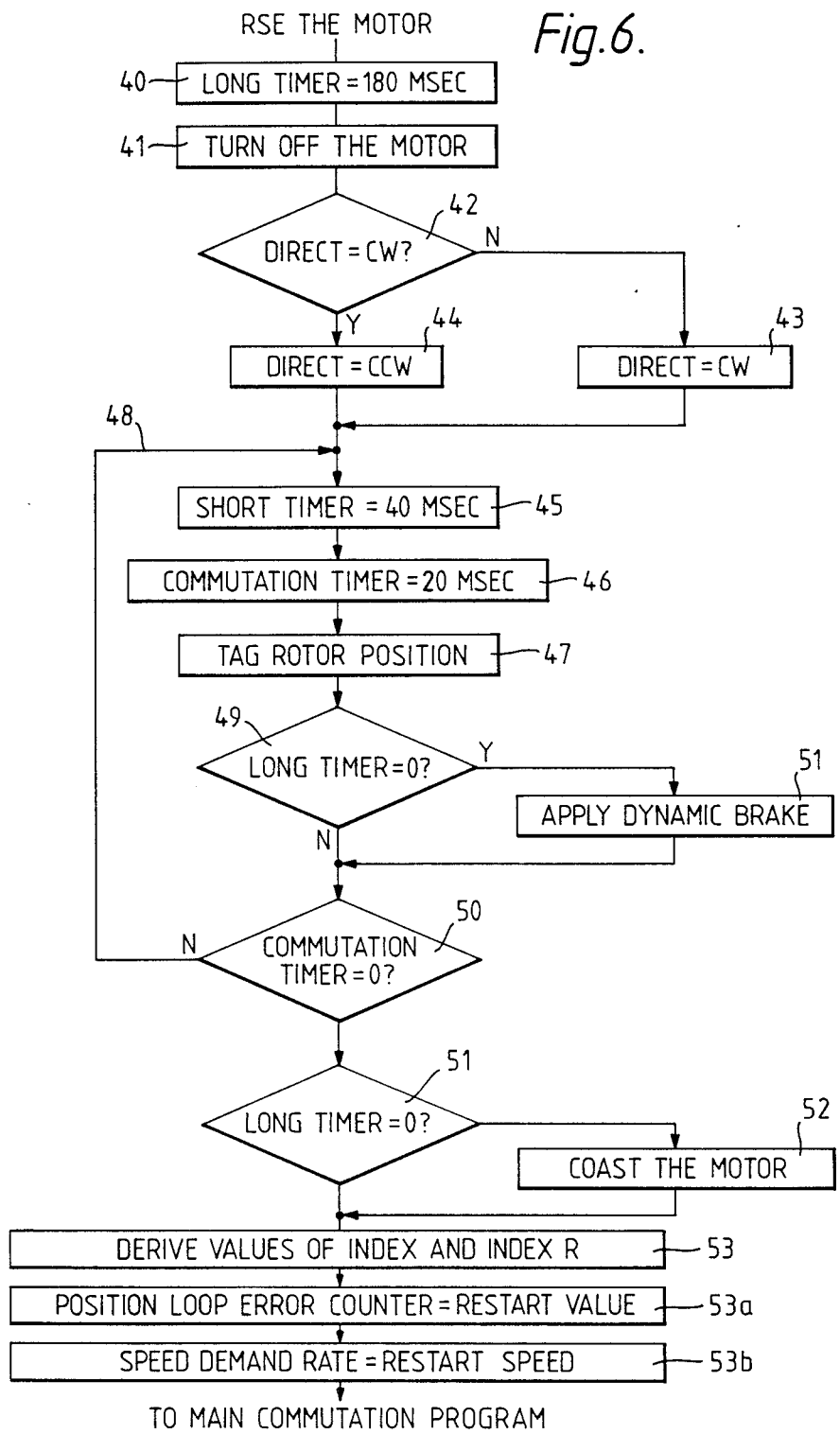
FIG. 6 is a flow diagram of motor reversing sequences.

Referring now the FIG. 6 which is a flow chart of the reversing sequence of the present invention it will be assumed that the microcomputer has timed out the application of power to the motor and the motor is switched off i.e. all power is disconnected from the stator. A long timer 40 is set to 150-200 milliseconds preferably 180 milliseconds in block 40 which is an arbitrary maximum time of coasting. As stated power is turned off as indicated in block 41 and a check is made in block 42 of the register DIRECT provided in the microcomputer 10 to indicate whether the motor is going clockwise or counterclockwise. In the event that direction of rotation is clockwise the register value is changed to counterclockwise ready for starting in the next direction and vice versa, so that the appropriate blocks 43 and 44 are used as required. There is a second timer called the short timer which is set in block 45 to a value of 40 milliseconds. This timer provides a safety feature in that should the rotor stop then, of course, the succession of EMFs will also stop and no measurable signals will be transmitted to the microcomputer to work on. Accordingly the second timer assists in avoiding maloperation.

There is a third timer called the commutation timer which is set to 20 milliseconds in block 46. Now that value corresponds to a rate of occurrence of zero crossings sufficiently low as to allow reversing to take place.

Figure 7:
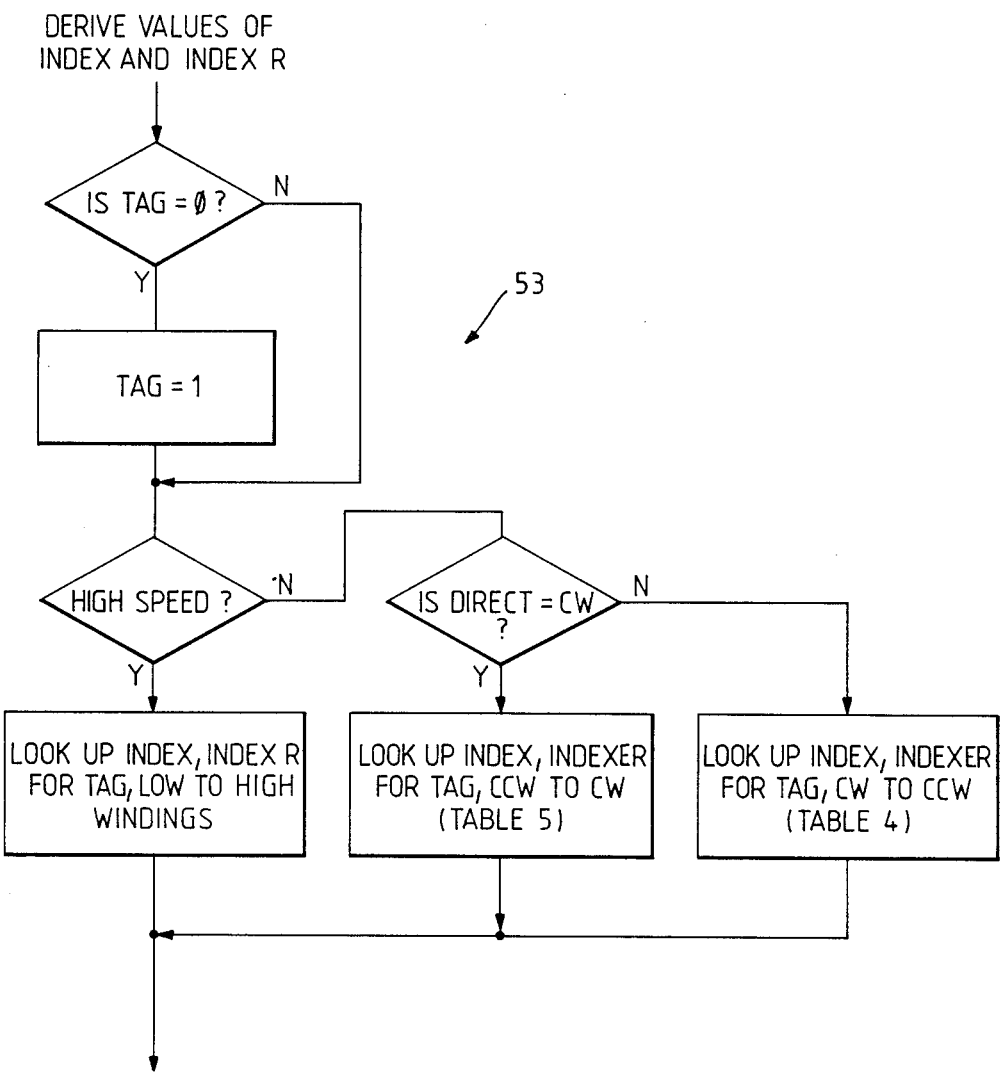
FIG. 7 is a flow diagram of deriving values of index and indexr.
Figure 8:
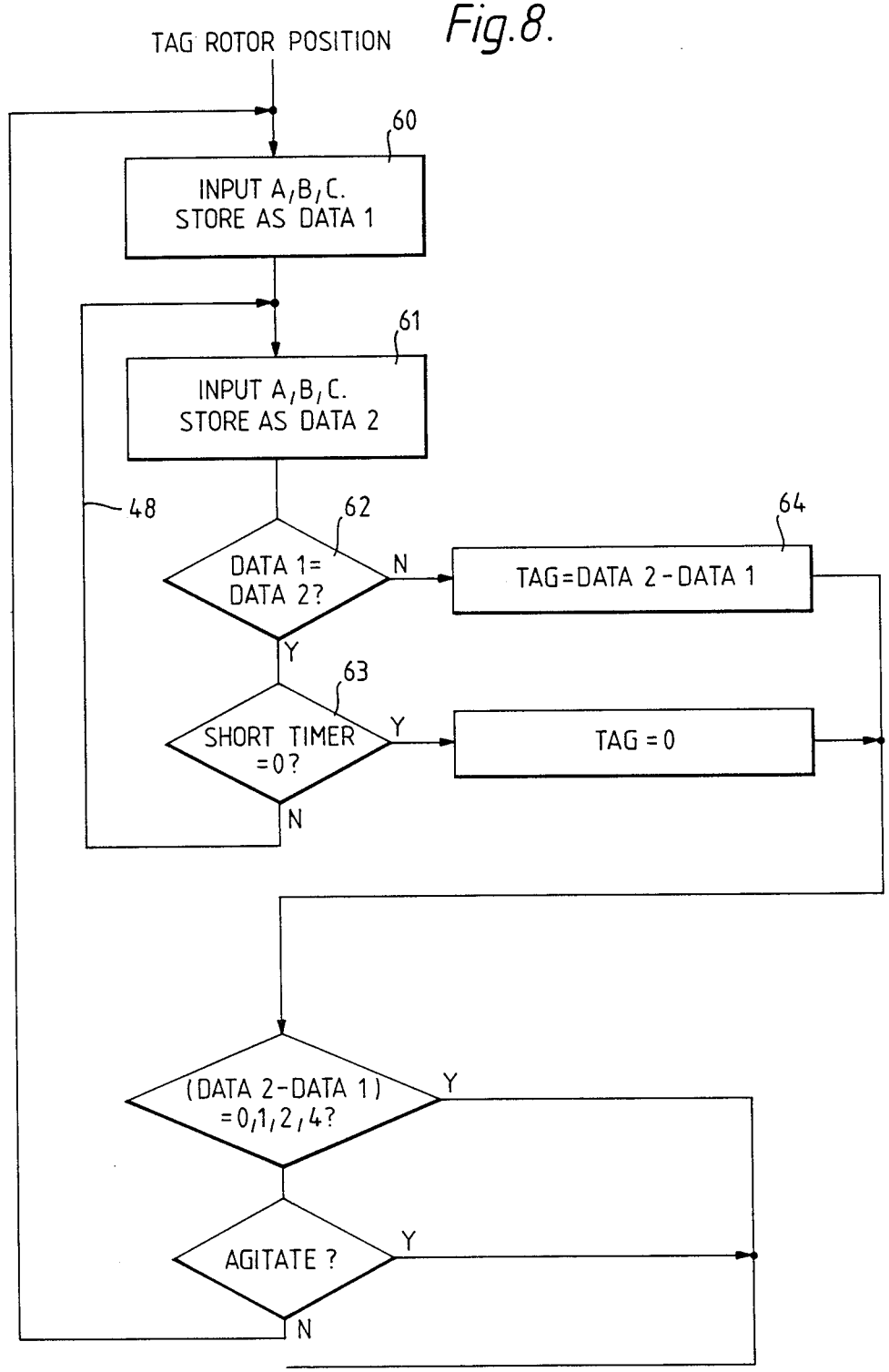
FIG. 8 is a flow diagram for determining the rotor position.

Next there is a tag rotor (tag corresponding to R3 in the Boyd Muller Specification) position indicator which senses the position of the rotor in block 47. This is related to Tables 4 and 5, Table 4 being used when it is required to go from clockwise to counterclockwise and Table 5 when it is required to go from counterclockwise to clockwise as is explained more fully in FIG. 8. Thus a start is made by inputting the values of A, B and C, that is the outputs of the voltage digitizing circuit. These are stored in memory as data 1 (block 60 FIG. 8). Then the values corresponding to the EMF signals are inputted again and stored as data 2 block 61. These data 1 and data 2 in are then compared in block 62. If they are equal and if the short timer is not equal to zero in block 63, that is to say a transition has not yet been reached the computer (as indicated by line 48) takes the measurements again of A, B and C, comparing them to the previous value. As soon as data 1 is not equal to data 2, data 1 is then subtracted from data 2 and this gives a value in hexadecimal for the transition. That is put into the storage register called "Tag" block 64. Then the flow diagram is traversed further to see if the modulus of data 2 minus data 1 equals 0, 1, 2 or 4 each of which is one of the allowed values. If it is not, there is something wrong and it is a matter of going back to the beginning and restarting the whole procedure again because the values are incorrect for whatever reason. Normally however such values are correctand there is a valid change and the routine above set forth is then moved out of. If there is no transition within 40 milliseconds as indicated by the short timer then the rotor is down to a speed at which reverse direction can take place. If a transition is obtained within 20 milliseconds as indicated by commutation timer then the rotor is still spinning at a rate greater than that allowable for reversal and it is necessary to run through the sequence again. If the long timer has not reached 0 as checked in block 49 then we have to check to see if the commutation timer is equal to 0 as checked in block 50 (FIG. 6), if it is not, then it is known that the rotor is still spinning. The sequence goes around monitoring the position, keeping up to date and getting a new value of the rotor position every time the sequence has gone through. If the long timer which is set for 180 milliseconds (a little longer than the expected coating time), times out then it is necesary to apply a dynamic brake, e.g. by short circuiting all the windings one to the other. The short timer 45 is a safety device which ensures that the routine is not continually gone through searching for a timing out when in fact the rotor has stopped and although looking for a change no such change will occur because there is no EMF generated to create such a change. Thus when the commutation period gets greater than 40 milliseconds the device times out. Assuming that a transition has been found within the allowable parameters then values are derived for INDEX and INDEXR at block 53 which is explained in detail in FIG. 7. When the rotor is down to a speed at which reversal can take place, information stored in register tag and direction register diect defines where the rotor is and its direction of rotation. Accordingly values of INDEX and INDEXR according to either Table 4 (clockwise to counterclockwise rotor position sensing) or Table 5 (counterclockwise to clockwise rotor position sensing) are chosen and windings energized which will cause a torque to the rotor which cause the rotor to reverse direction from its previous direction. If for example the EMF from the motor windings when the rotor is coasting are those resulting from clockwise rotation, such EMFs will follow the pattern of FIG. 2, and supposing the rotor is in a position where EMF C is high, EMF B is low and EMF A is changing from low to high i.e. the transition point 55 in FIG. 2 is reached and has been reached in time greater than 20 milliseconds (in normal operation) after transition point 56 has been reached. If power were applied to continue in the same direction the switchings to the windings would be A+ and B— but since it is required to reverse direction and it will be seen that in FIG. 3 transition point 57 corresponds to transition point 55 in FIG. 2 so that to provide reverse torque switchings B+ and A— will energize the required windings. In some circumstances energizing of C— intead of A— may be used since EMF A is falling to the right of transition point 57 while C is rising. Thus in Table 4, Index 3 relating to Table 2 is chosen in preference to Index 4 and when the EMF in the selected winding drops back to zero due to rotor speed dropping to zero commutation increments to index 4 in Table 2 and sequence continues in selected order. The position loop error counter 15 is set to a restart value in block 53*a* the speed demand rate 16 is set to a restart speed in block 53*b* and the microcomputer then returns the timing to a main commutation programme. Of course during agitate the reverse routine shown in FIG. 6 is reverted to at each reversal until the end of the wash cycle determined in this method by command module 11 which commands microcomputer 10 to cease and a further routine entered into e.g. draining then spinning.

It will be seen that by following the reverse routine in which the position of the rotor is monitored down to a point and speed in which the rotor is in condition for reversal a reversal can be effected in a single commutation period causing the motor to pass through the stop and reverse direction without loss of rhythm unless braking has had to be effected. When braking is effected it may be necessary to go back to the start routine above described in which the selected switches are turned on and indications from the windings used to indicate whether the rotor is moving in the right direction. If it is not, then the motor is force commutated to change direction of the rotor and pick up acceleration speed as above described. However this does not happen usually in practice but the smooth transition with change of direction within about one commutation period effected.

Furthermore even with dynamic braking in which the motor winding ends are connected together it is still possible to monitor the velocity of the rotor down to the point of reversal thus reducing the time in which reversal is effected. In the voltage digitizing circuit of FIG. 5, unlike the Body Muller circuitry, the star point voltage VN is brought into the circuit 13. The voltage at the star point is the vector sum of the three EMF's generated in the windings and varies at the commutation rate. The signals from the comparators are not in the same sequence as an open circuit when coasting but are in synchronism with the rotor and accordingly the velocity of the rotor can be measured and reversal commenced when the velocity falls to a desired level. Thus in testing for transitions when the agitating sequence has not been interrupted then the changes which take place are monitored and the numbers go from all 0's to all 1's not all at the same time, but the pattern is sufficient to enable the time for reversal to be determined.

Thus referring FIG. 4, braking is effected by making switches 31, 32 and 33 conductive there is a small voltage drop in these switches and although VA, VB and VC all move together and therefore it is not possible to tell the position of the rotor, the comparators of FIG. 5 will detect small voltage variations (about 1 or 2 volts) between the VA, VB and VC voltage and the VN voltage to enable the rate of movement to the indicated and passed on to microcomputer 10.

TABLE I

DATA FOR CLOCKWISE ROTATION
DIGITAL SIGNALS

| P2 Line | Rail Disable | Sequence of Patterns | | | | | |
|---|---|---|---|---|---|---|---|
| 7 | Top | 0 | 1 | 0 | 1 | 0 | 1 |
| 6 | Btm | 1 | 0 | 1 | 0 | 1 | 0 |
| 5 (B−) | | 1 | 1 | 1 | 1 | 0 | 0 |
| 4 (C+) | | 1 | 1 | 1 | 0 | 0 | 1 |
| 3 (A−) | | 1 | 1 | 0 | 0 | 1 | 1 |
| 2 (B+) | | 1 | 0 | 0 | 1 | 1 | 1 |
| 1 (C−) | | 0 | 0 | 1 | 1 | 1 | 1 |
| 0 (A+) | | 0 | 1 | 1 | 1 | 1 | 0 |
| INDEX: | | 0° | 1 | 2 | 3 | 4 | 5 |
| INDEXR: | | 0 | 1 | 2 | 3 | 4 | 5 |
| CONTROL: | | A+ | B+ | B+ | C+ | C+ | A+ |
| SIGNALS: | | C− | C− | A− | A− | B− | B− |
| DIGITISED VOLTAGE | | 01 | 02 | 04 | 01 | 02 | 04 |
| MASK: | | (B) | (A) | (C) | (B) | (A) | (C) |

TABLE II

DATA FOR COUNTERCLOCKWISE ROTATION
DIGITAL SIGNALS

| P2 Line | Rail Disable | Sequence of Patterns | | | | | |
|---|---|---|---|---|---|---|---|
| 7 | Top | 0 | 1 | 0 | 1 | 0 | 1 |
| 6 | Btm | 1 | 0 | 1 | 0 | 1 | 0 |
| 5 (B−) | | 0 | 0 | 1 | 1 | 1 | 1 |
| 4 (C+) | | 1 | 0 | 0 | 1 | 1 | 1 |
| 3 (A−) | | 1 | 1 | 0 | 0 | 1 | 1 |
| 2 (B+) | | 1 | 1 | 1 | 0 | 0 | 1 |
| 1 (C−) | | 1 | 1 | 1 | 1 | 0 | 0 |
| 0 (A+) | | 0 | 1 | 1 | 1 | 1 | 0 |
| INDEX: | | 0 | 1 | 2 | 3 | 4 | 5 |
| INDEXR: | | 12 | 13 | 14 | 15 | 16 | 17 |
| CONTROL: | | A+ | C+ | C+ | B+ | B+ | A+ |
| SIGNALS: | | B− | B− | A− | A− | C− | C− |
| DIGITISED VOLTAGE | | 04 | 02 | 01 | 04 | 02 | 01 |
| MASK: | | (C) | (A) | (B) | (C) | (A) | (B) |

TABLE III

CLOCKWISE ROTOR POSITION SENSING
(LOW TO HIGHSPEED WINDINGS)

| B | 0 | 0 | 1 | 1 | 1 | 0 |
|---|---|---|---|---|---|---|
| A | 1 | 1 | 1 | 0 | 0 | 0 |
| C | 1 | 0 | 0 | 0 | 1 | 1 |
| HEX: | 6 | 2 | 3 | 1 | 5 | 4 |
| TAG: (DATA2−DATA1) | 2 | −4 | 1 | −2 | 4 | −1 |
| INDEX: | 5 | 0 | 1 | 2 | 3 | 4 |
| INDEXR: | 5 | 0 | 1 | 2 | 3 | 4 |

TABLE IV

APPENDIX
CLOCKWISE TO COUNTERCLOCKWISE
ROTOR POSITION SENSING

| B | 0 | 0 | 1 | 1 | 1 | 0 |
|---|---|---|---|---|---|---|
| A | 1 | 1 | 1 | 0 | 0 | 0 |
| C | 1 | 0 | 0 | 0 | 1 | 1 |
| HEX: | 6 | 2 | 3 | 1 | 5 | 4 |
| TAG: (DATA2−DATA1) | 2 | −4 | 1 | −2 | 4 | −1 |
| INDEX: | 3 | 2 | 1 | 0 | 5 | 4 |
| INDEXR: | 15 | 14 | 13 | 12 | 17 | 16 |

TABLE V

COUNTERCLOCKWISE TO CLOCKWISE
ROTOR POSITION SENSING

| B | 1 | 0 | 0 | 0 | 1 | 1 |
|---|---|---|---|---|---|---|
| A | 1 | 1 | 1 | 0 | 0 | 0 |
| C | 0 | 0 | 1 | 1 | 1 | 0 |
| HEX: | 3 | 2 | 6 | 4 | 5 | 1 |
| TAG: (DATA2−DATA1) | 2 | −1 | 4 | −2 | 1 | −4 |
| INDEX: | 3 | 2 | 1 | 0 | 5 | 4 |
| INDEXR: | 3 | 2 | 1 | 0 | 5 | 4 |

Turning now to the second aspect of the invention, as stated above the digitizing circuit 13 is responsive to the Back EMF of the ECM 2 to provide a simulated signal indicative of the position of the ECM rotor.

Velocity control of the ECM 2 is provided by a microcomputer controlled digital implementation of a position control loop referred to later. Position and velocity feedback information is contained in the outputs of the voltage digitizing circuit 13. Commutation rate sensing software 14 in the motor control microprocessor 10 supplies a count of one to position error counter 15 for each commutation. Each count decrements the counter by one. The count rate is therefore proportional to motor velocity. Requested velocity information is provided by speed demand rate timer hardware/software 16 which supplies a count rate to position error counter 15 equal to the required motor commutation rate, that rate having been indirectly selected by appropriate actuation of manual selection controls in the user controls 9. Speed demand rate timer 16, amplifier stages, pulse width modulation controls 18, commutation control signal generator 8, commutation circuit 17, voltage digitizing circuit 13 and commutation rate sensing circuit 14 define the feed back position control loop the summation point being the position error counter 15.

The position error counter 15 algebraically sums the positive pulse rates for the speed demand rate 16 and the negative commutation rate sensing device 14. The output from the position error counter 15 appears as an error signal being the algebraic difference between the two counts which controls the current (and hence power) in the motor by a Pulse Width Modulated Control Circuit 18 with current limit control 5. The error is the difference between the desired count as indicated from the speed demand rate indicator 16 as compared with the commutation rate device 14. A zero PWM rate is the equivalent of a zero count and a 100% PWM rate is the equivalent of a full scale count. This aspect is explained more fully in U.S. patent applicaton U.S Ser. No. 709043 by Neil Gordon Cheyne filed 7 March 1985, now abandoned, with a continuation application filed Aug. 24, 1987, Ser. No. 088,657, the specification and drawings of which are incorporated herein by reference and which explains improved pulse width modulated control methods for controlling current (and hence power) to an inductive load with special applications to D.C. Motors. In this way the Digital Position control loop is arranged so that when the ECM is rotating at a speed less than that requested by Speed Demand Rate Timer 16 low speed power is increased until current limit is effected to give faster acceleration but during steady speed operation the error and hence PWM pulses are maintained and controlled to control the power input to the ECM to that which is sufficient to maintain speed.

User controls 9 are provided and in the preferred embodiment include a command microcomputer 19 which translates the user commands into signals to the motor control microcomputer 10. Thus the speed demand rate is set by commands initiated by the user controls 9 and these controls have commands relating to a wash programme selection e.g. delicate, regular, heavy duty, wool, permanent press and also a selector relating to water level e.g. low, medium and high water level. Each of these imposes a different power demand, stroke angle, acceleration rate and speed from the other on the wash load imposed on the agitator 1 which is mounted within a spin tub 3 and water container 4 in the known way. In FIG. 1 the motor 2 is shown driving direct to the agitator 1 but of course an indirect drive could also be used.

The above describes an electronic controlling circuit which enables the speed of the motor 2 to be controlled.

Figure 9:
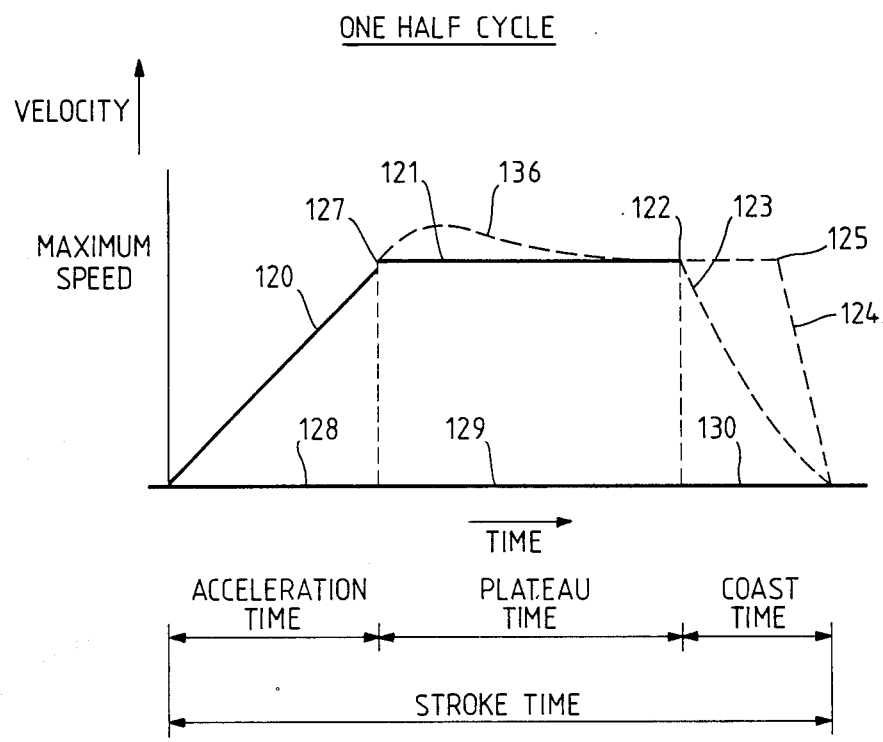
FIG. 9 is a graph showing the motor and hence the agitator velocity profile during a half cycle of agitator oscillating rotation in a wash mode.

Referring now to FIG. 9 this indicates a profile of velocity against time of one half cycle in the oscillatory rotation of the agitator by the motor 2. As may be seen power is applied to the motor to achieve three steps in the half cycle, an initial step 120 of acceleration from zero velocity to a desired maximum velocity a second step 121 at which the maximum velocity is maintained until a cutoff point 122 is reached when power is removed from the motor and a third step during which the rotating assembly of the motor and the agitator then coasts to a stop substantially in accordance with either for example curve 123 or as is shown in smaller pecked lines curve 124, the curve 124 starting from a different cutoff point 125 which will be explained further later. Thus there are three different times, an acceleration time 128, a plateau time referenced 129 when substantially constant speed is maintained subject to matter discussed below and a coasting time referenced 130. The sum of these times results in a total stroke time.

Of these times the acceleration time 128 and the plateau time 129 are electronically controllable but the coasting time 130 is dependent on mechanical conditions involving the inertia of the rotating assembly including the rotor of the motor and the agitator and associated drive gear against which is acting the resistance of the load of fabrics placed in the spin tub 3. Accordingly the coast time 130 will depend on and vary according to the load placed in the washing machine plus other smaller factors such as the effect of heating up of bearings.

A desired washing action will vary from a gentle action if the "delicate" control is actuated to a heavy duty vigorous action if the "heavy duty" control is actuated. In a particular washing machine which has been made, five types of washing actions had been provided as mentioned above namely delicate, regular, heavy duty, wool and permanent press and three different water levels so that it is possible to have 15 combinations or 15 different agitator velocity profiles that must be achieved.

To do this command microcomputer 19 feeds commands based on information from user controls 9 to the motor control microcomputer 10 which define the acceleration time, the stroke time and the maximum speed of rotation according to the selection made in the user control circuit 9 and which have been preprogrammed into the command microcomputer 19.

Motor control microcomputer 10 retains this information and commands the motor to agitate following the required profile via the digital position control loop as explained below repeatedly until instructed to stop by the command microcomputer 19.

The method for control of acceleration time 128 can be explained with reference to FIG. 10.

Figure 10:
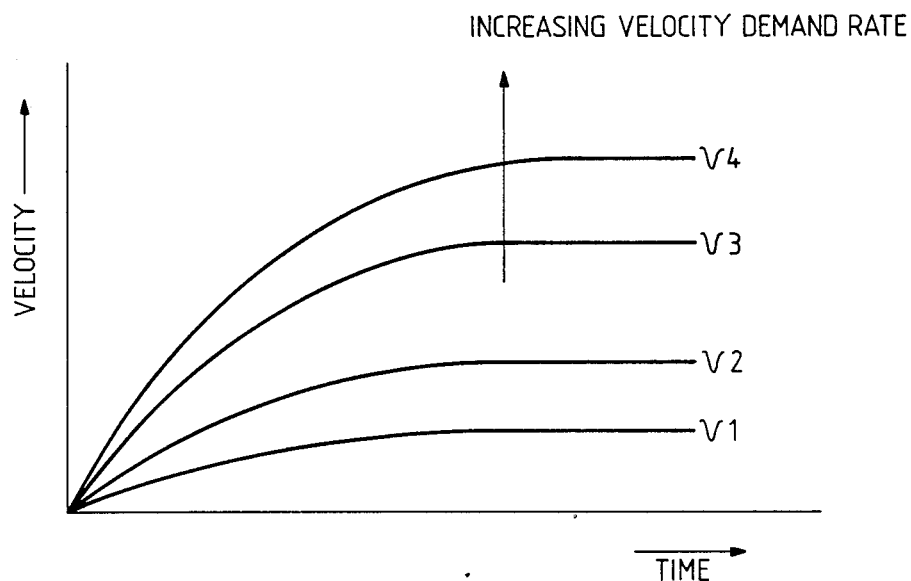
FIG. 10 is a graph showing a series of acceleration profiles.

In FIG. 10 are shown typical curves of the velocity/time showing the effect of velocity demand on acceleration. Thus FIG. 10 is a plot of velocity versus time for the motor. The information provided by operating the user control in circuit 9 is based on the motor being started at zero speed and that the contents of the position error counter is at zero. Accordingly the command defines an acceleration rate i.e. requested velocity that must be achieved in the acceleration time 128 of FIG. 9. That velocity can be provided either as motor RPM, agitator RPM or commutation rate and suitable circuitry provided dependent on the type of information provided. The various curves V1 to V4 in FIG. 10 show the different acceleration rates resulting from velocity demand rates for one resistance to rotation of the motor and show the time taken to reach a maximum velocity or speed.

As can be seen in FIG. 9 acceleration rate increases with increasing speed demand rate. Each curve is essentially linear over its first portion. Time to reach requested speed is almost independent of speed demand rate but is a function of the loop gain of the position control loop.

For any given velocity profile the acceleration must be such that a set speed i.e. the plateau speed 121 shown in FIG. 9 must be achieved in a certain time. Accordingly the command must be set to provide a definite acceleration rate i.e. reaching the set speed in a given time. However the load on the agitator is not at this time known and therefore initially a speed demand rate is initialised which will reach the maximum speed in the given time under arbitrary predetermined conditions. The preferred method of operation is to initially set a speed rate demand which will result in an acceleration rate which is slightly less than that ultimately desired and then to adjust the speed demand rate upwardly to the desired speed over the next dew cycles. Thus giving a wash action which is more gentle than would be obtained by moving quickly to the maximum speed with the possibility of overload occurring. This is achieved by adjusting the loop gain of the velocity control loop in any known way such that the time taken to reach the required plateau speed when speed demand rate timer 16 is loaded with that plateau speed rate is greater than the range of times required. One way is to adjust the error value contained in position error counter 15 required to achieve 100% PWM rate. If the load in the machine is light the agitator will accelerate to speed more quickly than if the load is heavy. Accordingly the present invention provides programming of the microcomputer such that the speed at the end of the required acceleration time is measured. If that speed is below the required speed the microcomputer issues an instruction to increase the speed demand rate at the beginning of the next agitator stroke. Similarly if the motor is above speed at that time the command is to reduce the speed demand rate and thus reduce the power applied to bring the motor up to the plateau speed. This testing of the acceleration rate is carried out on each half cycle whether that half cycle is in the forward direction as shown in FIG. 20 or in the reverse direction. Thus the oscillating rotation i.e. the back and forth motion of the motor 2 and the agitator 1 is such that the resistance to oscillation or rotation is measured at each half cycle and by modifying the acceleration rate to always bring that acceleration rate to a position where the plateau speed is achieved in the set acceleration time and substantial uniformity of operation is thus attained. Thus acceleration is controlled to achieve the desired plateau speed in the desired time, and this acceleration speed is maintained within practical limits.

Plateau speed is maintained by adjusting the speed demand rate 16 to the speed demand rate required for the plateau speed at time 127 in FIG. 9.

Figure 11:
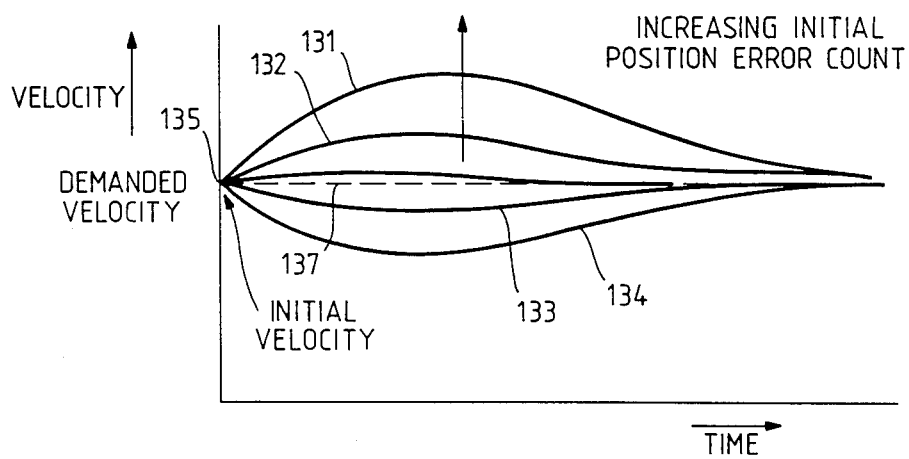
FIG. 11 is a graph showing resultant curves under operating conditions between the completion of the acceleration mode and the cutoff point of applying power to the motor.

However consideration must now be given to the circumstances illustrated in FIG. 11. In this figure the demanded velocity is shown by a pecked line 137. A series of curves are shown, the upper curve 131 showing an overshoot and curve 132 shows a lesser overshoot while curves 133 and 134 show two undershooting curves of velocity. This is brought about by the varying position error count in the position error counter 15. If there is a heavy load it takes considerable power to get to speed and the power to get to speed is greater than that required to maintain that speed and that is indicated by a large counter value in the position error counter 15 and hence a high PWM ratio in circuit 18. Accordingly at the time of reaching the point 135 in FIG. 11 (which corresponds with point 127 in FIG. 9) there is more power applied to the motor than required to maintain the motor at the demanded velocity 137 and the motor will thus continue to accelerate for a short time and overshoot as can be seen by either of curves 131 and 132. This can be provided for by adjusting the value set in the position error counter 15. If the initial position error count is set at a low level there is an undershoot below point 135 with the power then being levelled off by the above checking of the speed and comparing that speed with a desired count rate or alternatively the acceleration power can be maintained to above point 135 so that there is an overshoot and then the automatic error counting is carried out to reduce the overshooting curve down to the demanded velocity straight line 137. The value of the position error counter or the speed demand rate can be adjusted at any time under control of the microcomputer so that the actual count can be updated or modified as desired and since the counter is within the microcomputer, it can be loaded at any time.

Now the value of that counter at 127 in FIG. 9 is an indirect measure of the wash load. Where we have a high value in the counter we have a large wash load, a small value in the counter shows a small wash load. Now to further increase the power that we have applied to the load as that load increases in excess of that required to maintain the profile as explained to maintain a given level explained in background we can adjust the amount of overshoot to obtain any profile. What is done is that the value of the counter is adjusted such that with only water in the bowl there is no overshoot then as clothes are added or as the load is increased the value is adjusted in the counter to allow small amount of overshoot. This small amount of overshoot increases the stroke length of the agitator slightly and increases the turnover in the clothes. This is explained above in the background material but essentially wash action is provided by movement of clothes through the water and how vigorous this movement is determines the soil removal. However by increasing the stroke length slightly the required wash requirements are maintained. The acceleration rate and velocity desired in for example delicate wash are such that slight lengthening of the stroke angle does not result in excessive washing action.

The function of maintaining acceleration rate by adjusting the speed command rate and controlling overshoot allows slight increases so that under very heavy loads the stroke length is increased slightly. If the acceleration rate is not controlled then typically with a velocity controlled motor if just a final speed is requested, the error in position error counter increases and the acceleration rate decrease with load and results in a decreased stroke angle and lowered soil level removal.

It is necessary now to look at the coasting time and curves of FIG. 9. As stated above the deceleration rates of the agitator and motor are not electronically controllable. The rotating assembly can only be allowed to coast to a stop or be braked to a stop and thus are not electronically controlled. Now if the coast time were fixed so that it could be guaranteed that the motor would coast to a stop before an attempted reverse or almost to a stop before reversal could be effected it would be possible to end up with a shorter stroke time as the load increases because we have the sitation that the maximum time to coast to standstill is when there are no clothes in the water. As the clothes load increases the coasting time becomes shorter and thus the area under the curve in FIG. 9 becomes less and since that area is proportional to the stroke angle that we are applying to the clothes load or the agitator if deceleration is effected more quickly then the stroke angle applied to the load is decreased which is disadvantageous. The opposite effect is however desired, namely, that it is desired to increase stroke to the load as the load increases and therefore the following technique is also adopted. The stroke time is set to a predetermined figure by a command received from circuit 9. This stroke time is for practical purposes the same for all wash duties. This means that as the coast time decreases the plateau time must be increased so that the point 122 in FIG. 9 is not a point fixed in time but a point which is determined as follows. For each half cycle, the microprocessor measures the time to coast from plateau speed to substantially zero speed and the microprocessor subtracts that time from the stroke time and also subtacts the required acceleration time from the stroke time which leaves a plateau time required for the next stroke so that for each half cycle of the agitator the microprocessor calculates a new plateau time depending on the last coasting time and as may be seen from FIG. 9 two different coasting times and two examples of different plateau times are shown. In the first the plateau time is the time to extend from point 127 to point 122 and for the second, assuming the same acceleration time, from the point 127 to the point 125 and the deceleration or coasting curves are as shown by the lines 123 and 124 respectively. Accordingly at least in the preferred form the invention comprises the combination of the three techniques for controlling acceleration and altering the acceleration time as desired controlling the overshoot or undershoot in relation to the desired maximum speed in the second zone of FIG. 9, recalculating the plateau time for each half cycle depending on the coasting time in the last half cycle and then reversing the rotating assembly immediately at or near zero speed. This allows the maintenance of any required washing performance. Corrections are made continuously and by monitoring the curves such as those shown in FIG. 9 on a oscilloscope it can be seen that variations occur substantially all the time because the load on the agitator may well depend on the position of the clothes in the container and those clothes may be bunched or balled in some cases and almost immediately the bunching can be freed by the agitator action so that the load on a next half cycle is considerably lighter than when the clothes are bunched during a previous half cycle. The time to accelerate to a given speed may take a number of strokes to settle which provides a high averaging effect which prevents large disturbances. For example if a bunching of clothes is only momentary then if it were not for some delay in averaging out there could be violent disturbances in the speed of actuation of the agitator and this could cause too vigorous an action and with a heavy load then there is an increased power input which is what is required.

In a less preferable alternative it is possible to allow the stroke time to vary. In such an alternative the maximum speed would be more closely monitored so that extra area under the curve of FIG. 9 and therefore the extra stroke angle for heavier loads would be gained by extending the power cut off point as required.

Figure 12:
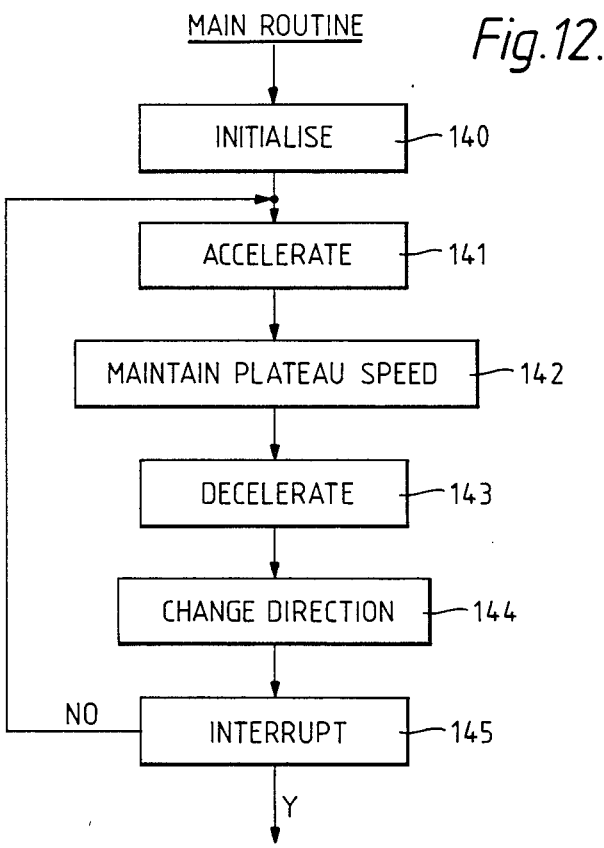

The sequence of operations will now be explained in relation to the flow diagrams shown in FIGS. 12 to 16. The flow chart of the main routine shown in FIG. 12 can be explained with reference to FIG. 9. This is the routine required to agitate and the first initial block 140 is shown in more detail in FIG. 13 where the notations are: T-stroke is stroke time, W-ramp is ramp time, and End-speed is the maximum required speed. Once initialisation has taken place there are four things to do, first it is necessary to start at the beginning of the stroke to accelerate till point 127 in FIG. 9 is reached to maintain a plateau speed along the plateau 121 shown in FIG. 9 and then to coast to a stop after power has been switched off at 122 and then to reverse the direction of agitation and recommence the cycle in a "upside down" disposition from that shown in FIG. 9. These steps are shown in FIG. 12 where acceleration is shown in block 141 maintain plateau speed shown in block 142 the decelerate or coast is shown in block 143 change direction is shown in block 144 and additionally in block 145 there is a decision to be made as to whether agitation is to be concluded and if so the command microcomputer 19 sends a signal to the motor control microcomputer to interrupt the sequence at a selected time that agitation is to be ended. If the answer is no then the accelerate maintain coast and change direction cycle is maintained for a further cycle and so on until the interrupt signal is given. A yes (Y) answer results in the end of agitation and the washing cycle then goes into a further routine which does not form part of the present invention.

Figure 13:
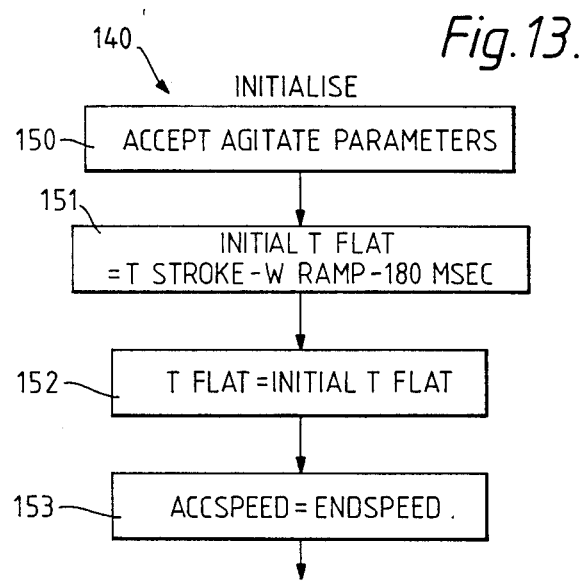

Now referring to FIG. 13 when initialization is commanded the parameters fed to the motor control microcomputer 10 are stroke time and acceleration time but it is necessary for the plateau time i.e. for the point of 122 to be calculated. Thus the acceptance of the agitate parameters are shown in block 150 and in block 151 there is a calculation of the initial plateau time shown as initial T-flat. This time is arbitrarily selected for the first stroke as the stroke time (which is a set time) minus the ramp time W-ramp which is the acceleration time and then an arbitrary 150 milliseconds which is taken to be a reasonable coasting time. Thus for the first stroke the T-flat time equals the initial T-flat time i.e. the time obtained by the calculation shown in block 151. This procedure is necessary since on initialisation there is no information as to what the real coast time is going to be so an estimate is made and subsequently after every stroke the actual coasting time is measured and used as will be explaind later.

As a next step it is necessary to known the speed to which the motor is to be accelerated. Again there is no information as to the speed likely to be attained in the time interval 128 on applying a known amount of power and accordingly as is shown in block 153 the speed to which the motor is to be accelerated referred to as ACC speed is shown as being the end speed i.e. the maximum speed to be obtained for the particular wash programme selected and the end speed for example as it is seen in FIG. 10 for any given velocity demand. Acceleration at the commencement is virtually linear and if commands are given to supply power to the motor so that a substantially linear acceleration is obtained up to the fixed demanded speed and for the first stroke the demanded velocity is to be equal to the plateau speed i.e. End-speed. However as explained above it is preferably to arrange the gain of the position loop such that acceleration is always less than normally required if initial acceleration speed demand rate equals End-speed when the agitator is operating in water only. The practical result of this is that End-speed or maximum speed is not actually achieved in time interval 128 for the first stroke.

Figure 14:
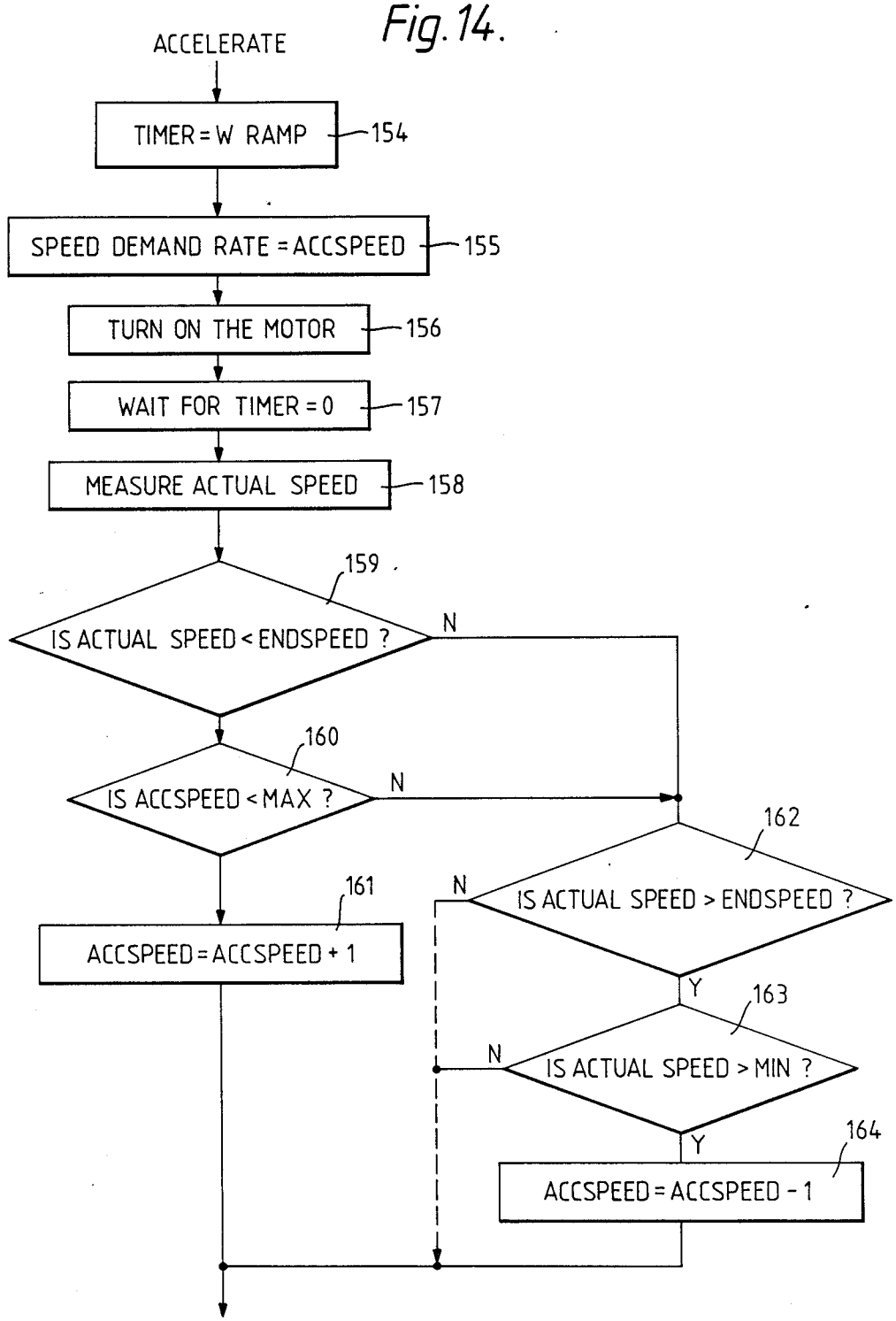

Looking row at FIG. 14 which is a flow chart during the acceleration phase the timer is set to W-ramp which is a fixed time in block 154. This timer is a timer which is set to the time and then counts down to zero so it is set with an initial value that is equal to the time that is required. It is set running which automatically happens when the timer is loaded and the microcomputer senses when it gets to zero so in future it knows how long it has taken to do something so the acceleration time is the acceleration portion shown in FIG. 9 namely slope 120. As shown in block 155 the microcomputer then loads the speed demand rate 16 and this is set at a rate equal to the acceleration speed ACCSPEED which for the fist stroke as we have discussed above is the End-speed as shown in block 153 FIG. 13. As shown in block 156 the rotor is started and acceleration takes place while as shown in block 157 the timer runs down to zero and at this stage the motor velocity will have reached about point 127 and at that point as shown in block 158 the actual speed is measured by use for example of the commutation rate sensing shown in block 14 FIG. 1 where the interval between commutations is measured by the motor control microcomputer. That actual speed is compared with the speed which is required in block 159. If it is less than the End-speed then the microcomputer checks to see if the acceleration speed is less than an arbitrary maximum as seen in block 160. If it is then the acceleration speed is incremented one step and retesting is carried out one step as seen in block 161 and retesting is carried out in the next half cycle. If the actual speed is not less than End-speed or acceleration speed is not less than the maximum then a check is made as in block 162 to check if the actual speed is greater than the End-speed. If no, then again the test is ended. If it is greater than End-speed, then as indicated in block 163 tests are made to see if the actual speed is greater than an arbitrary minimum, if so, then the acceleration speed is decremented in the next half cycle by one step as indicated in block 164. In this way the acceleration rate is adjusted in the next half cycle to provide an acceleration which will achieve the required demanded velocity within the time W-ramp. As stated, this entire process is effected for each half cycle.

Figure 15:
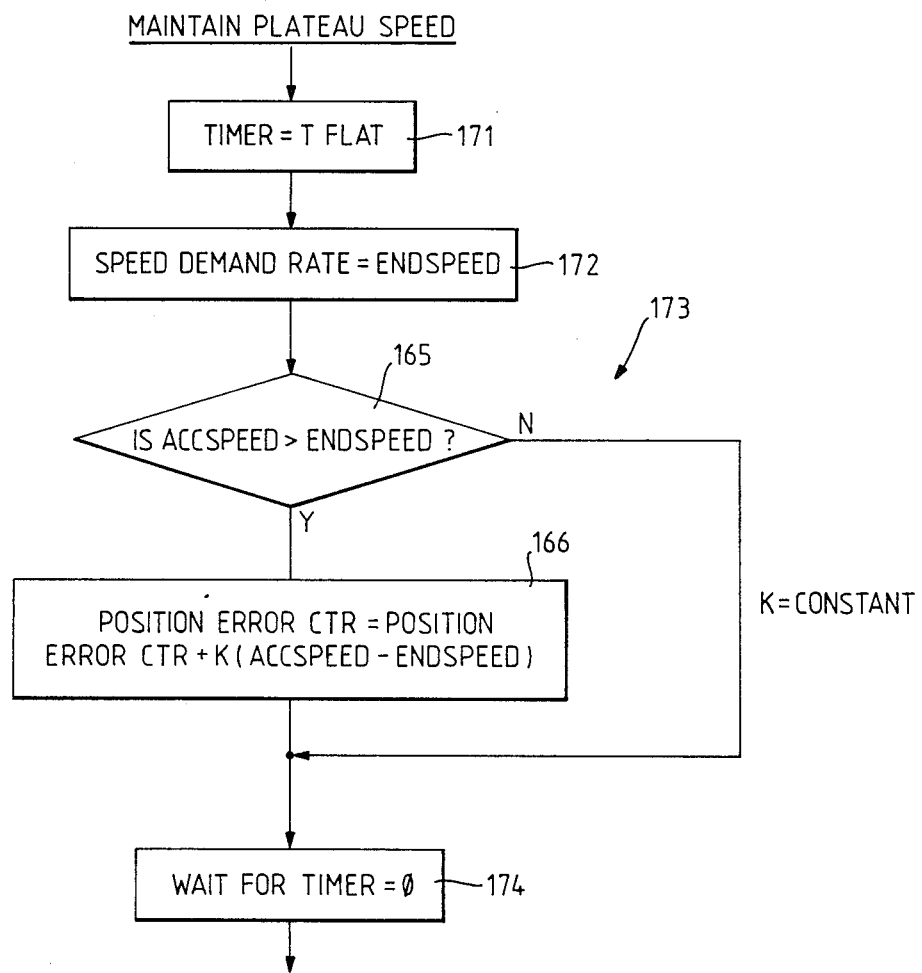

Looking now at FIG. 15 which is the flow chart to maintain the plateau speed. The timer has been set to T-flat which initially was the timing calculated in block 151 of FIG. 13. At point 127 FIG. 9 the speed demand rate is set to End-speed and the motor is intended to just maintain that speed. If the motor is not up to speed or above speed by this method the motor will automatically settle to the End-speed. The position error counter is also adjusted for whatever overshoot is required and this is illustrated in the flow chart of FIG. 15 where a test is made by the microcomputer in block 165 to see if the acceleration speed is greater than the End-speed if not, then no adjustment is made as indicated in block 166. If it is greater, then the position error counter is adjusted by an increment which is a constant K times the acceleration speed minus the End-speed. Of course if undershoot is desired the sign in this formula would be reversed. However in practice undershoot is not desired if the required speed is not achieved after initialisation step. After the adjustment has been made in block 173 the motor continues at its desired speed until the timer counts down to zero as shown in block 174. At this stage, which is point 122 on the curve of FIG. 9, power is cut off to the motor. It is to be noted that the question of compensation is one where if there is a large load of clothes then acceleration speed will be much greater than the End-speed and an overshoot curve such as that of 131 or 132, FIG. 11, will be followed and the result of this is that the stroke angle will increase slightly as the load increases. The higher the load the slightly greater the stroke angle and this has an improved effect in maintaining a wash rate substantially constant as between a light and a heavy load. It is noted that the stroke time is maintained but the stroke angle increases. With a traditional agitator washing machine with an induction motor it has a fixed speed so that not only does the stroke time stay the same but the stroke angle is virtually always constant although under heavy load it may reduce slightly. With a traditional machine the actual stroke profile virtually does not change with load. The power that goes into the load increases but only sufficient to maintain that profile. The present invention modifies the profile in accordance with the load and that is novel. Thus in modifying the profile the present invention actually overadapts the acceleration power to give an overshoot to give a greater area under the curve of FIG. 9 and thus apply extra power where there is a heavier load which is a desired result of the present invention. Thus the time to coast to zero is an indirect measure of the load on the agitator.

Having reached point 122 and the timer indicated in block 171 has timed out as shown in block 174 a coasting time of 180 milliseconds (just greater than the expected coast time) is chosen as shown in block 175 (FIG. 16) the motor turned off as in block 176 and then the motor coasts and the agitator will slow down under the load imposed by the clothes and other frictional effects.

The microcomputer waits on speed to fall to zero or the timer to empty to zero as shown in block 177 whether the timer reachee zero or not is tested in block 178. If the timer equals zero then braking is effected as shown in block 179 and the coding T-flat=initial T-flat selected in the microcomputer as shown in block 180. In such a case the motor is restarted under circumstances above outlined in which it may restart in the right direction or the wrong direction at random and force commutating is necessary as described above. If the timer does not equal zero, the microcomputer is programmed to T-flat which equals the remainder of the linear time plus the initial T-flat time. The time as shown at 180 in FIG. 16 to coast to zero speed is an indirect measure of the load on the agitator. The position and speed of the rotor is measured and the information supplied to the microcomputer as is described above.

As described above, while the rotor is coasting, EMFs are generated in the one or more unused windings and these EMFs can be sensed to indicate when an EMF changes sense i.e. crosses over a zero point. However other position or velocity and direction sensing devices can be provided e.g. Hall effect devices or light intercepting devices or with non-ECM type eg. brush, indiction of synchronous motors, it is still possible to measure the EMFs. However with such motors we do not need to know position, only speed. Thus the microcomputer senses when the rotor is approaching a position in which it is in condition for reversing and the time taken to reach this position is measured and used in calculating a new value of T-flat for the next half cycle. This is effected by taking the remainder of the timer of block 175 and if this time is not zero then the rotor has reduced to zero speed in less than 180 milliseconds. Thus the calculation shown in block 151 (FIG. 13) of T-STROKE minus W-ramp minus 180 milliseconds is modified by taking away the difference between 180 milliseconds and the actual time taken for the rotor to come (not shown in the flow diagram) and that provides a new calculation for the plateau time which is substituted for the calculation shown in block 151. However if the timer does get to zero in block 178 then the rotor is braked to stop in block 179 and the T-flat selected to be used is the initial T-flat as indicated in block 180. Once the rotor is at or near stopped, then unless the rotor has been braked to a stop as illustrated in block 179 then for an ECM, reversal is usually effected in a single commutation period as is described above.

In the event that agitation is to cease as illustrated at 145 in FIG. 12 then other parts of the washing cycle take over for example the drain is opened and the water allowed to drain out. As described above, the coasting time of a previous half cycle is algebraically subtracted from the stroke time to give the "power on" time for the next half cycle. However different adjustments are possible e.g. only every tenth or other number half cycle could be used to make the adjustment or the coasting times over a period, eg. over one second averaged to give a "power on" time for the next second.

An important aspect of the invention resides in the measuring of the coast time from the stroke time to give a "power on" time for the next cycle. Thus although this invention has been described in relation to an electronically commutated motor which gives added advantages in controlling acceleration rates and maximum speeds, an important advantage of the invention is this aspect can be gained using other motor types for example an induction motor. Such a motor may only be accelerated in a manner broadly dependant on the number of poles in its rotor and the load. However by controlling the cut off point 122 at which power is applied to the motor by subtracting the coast time of one half cycle from the stroke time to give an acceleration time and plateau time for the next half cycle, considerable control is given to the rate of extracting dirt consistent with a desired degree of gentleness of washing.

Figure 16A:
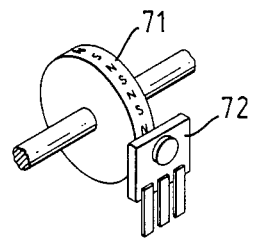
FIG. 16a is a diagrammatic view of a speed sensor for use with the invention.

Thus referring to FIG. 16a, a speed sensor driven by a rotor has a ring magnet 71 the multiple holes of which actuate a Hall effect transducer 72, the signals from which are in the form of pulses which vary in lines according to the speed of rotation of the ring magnet 71. When the pulse time reaches a predetermined length of time, reversing is effected.

Also photo sensitive devices can be used, for example as described in U.S. Pat. No. 4,005,347 the specification and drawings of which are incorporated herein by reference. In either case the time between switching off power to the motor and the motor being in condition for reversing is measured and used in a next half cycle to determine the "power on" time which give the required washing action.

Although the above descriptions are based on using a fixed stroke time, the invention in this aspect can also be put into effect with a variably stroke time operation.

Figure 9A:
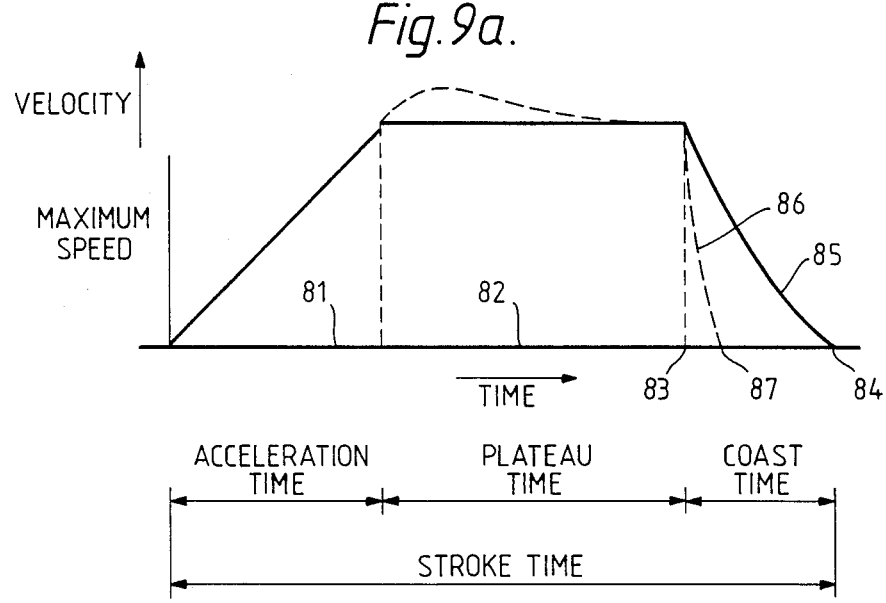
FIG. 9a is as FIG. 9 but illustrating action when the stroke time is variable.

Thus where the stroke time is to be variable according to the load in the washing tub and referring to FIG. 9a, which is similar to FIG. 9, the acceleration time 81 plus the plateau time 82 are set by the operator according to a required gentleness or vigorousness of washing to a fixed "power on" time. A small load will give a coast time indicated between points 83 and 84 with a delay curve 85. A large load gives a steeper delay curve 86 with a coast time indicated between points 83 and 87 and accordingly the motor will be in condition for reversal much earlier than in the light load coast time curve 85. If reversing is thus effected with a shortened stroke time more consistent washing performances will be obtained, whether the load is small or large.

What we claim is:

1. A method of cyclically reversing an electronically commutated motor having a plurality of windings on a stator and a rotor having magnetic poles rotatable relative to said stator and using electronic control apparatus and means to indicate the position of the rotor, said method comprising the steps of
   (a) initiating and then continuing a correct sequence of the commutations selected from a desired time of and desired number of the commutations,
   (b) removing all the power from the windings and allowing the rotor to coast towards zero speed of rotation,
   (c) testing and establishing a position of the rotor relative to the stator at least during a later part of the coasting of the rotor, and
   (d) when the rotor has slowed to a condition in which application of reversed commutation will cause reversal of rotation but is still rotating (condition for reversing) and its position relative to the stator is established, and without delay after the condition for reversing, applying power to the stator windings and effecting entry into said correct sequence of the commutations of power to the winding, the position of entry into said correct sequence being determined by the direction of rotation of the rotor before stopping and the position of the rotor relative to the stator to cause the rotor to change direction, the correct sequence of commutations follows automatically to maintain rotor rotation in the changed direction, and repeating steps (b) to (d) to give cyclical reversal for a desired time.

2. A method as claimed in claim 1 which includes the steps of indicating the direction and sequence of back EMFs in said windings after power has been removed therefrom and at least as the rotor nears a position where it is in the checking voltage transition points between positive and negative in at least one of said windings caused by the back EMFs in said at least one of said windings and the step of applying power and effecting entry comprises the step of entering the sequence of the commutations to cause reversal about a time when such a voltage transition point occurs in a selected winding.

3. A method as claimed in claim 1 or claim 2 wherein the step of testing and establishing includes the steps of testing back EMF from at least one of the windings for polarity and frequency, and wherein the step of applying power and effecting entry comprises the step of entering the sequence of the commutations when the frequency of the back EMF has fallen to a value such that the rotor has slowed to the condition for reversing and polarity is substantially at a zero crossing between opposite polarities in a selected winding.

4. A method as claimed in claim 3 in which the step of testing and establishing includes the step of testing all the windings to indicate the position of the rotor.

5. A method as claimed in claim 1 wherein the change in the sequence of the commutations usually occurs within a single commutation to cause a change in direction of rotation of the rotor.

6. A method for driving an electronically commutated motor cyclically in opposite directions during each of a sequence of half cycles, each half cycle comprising the steps of
   applying electrical power driving the motor in a reverse direction from the prior cycle causing acceleration of the motor towards a desired speed, switching power off to the motor and reducing the speed of the motor to a condition where applying power in the next half cycle will reverse the direction of motor rotation,
   determining resistance to rotation of the motor, and adjusting the power applied to the motor in the step of applying power so as to cause acceleration of the motor in accordance with the resistance to motor rotation determined during the prior half cycle.

7. Control apparatus for applying power to an electronically commutated motor having a plurality of windings on a stator adapted to be selectively commutated and a rotor having magnetic poles rotatable relative to said stator, said control apparatus comprising:
   (a) timing means to time the period of one of the rotation and counting means to count the number of rotations of the rotor in a desired direction,
   (b) commutation switching means to disconnect the power from said windings to allow the rotor to coast towards zero speed of rotation,
   (c) detecting means to indicate rotor position relative to said stator at least during a later part of the coasting of the rotor before the rotor comes to rest, and
   (d) pattern reverse means operable, in response to a signal from said detecting means when the rotor has slowed to a condition in which application of reversing commutations will cause reversal of rotation but is still rotating (condition to be reversed) and without delay after the condition to be reversed, for applying power to the stator windings and effecting entry into a correct sequence of the commutations of power to the winding, the position of entry into said correct sequence being determined by the direction of rotation of the rotor before stopping and the position of the rotor relative to the stator and thereby cause said rotor to change direction without testing for rotor direction.

8. Control apparatus as claimed in claim 7 wherein said detecting means detects the direction and sequence of back EMFs in at least one of said windings after the power has been removed therefrom and detectts voltage transition points between positive and negative polarity in at least one of the windings and said pattern reverse means is actuated to reverse the sequence of the commutations about the time when a voltage transition point occurs in at least one of the windings.

9. Control apparatus as claimed in claim 7 or claim 8 wherein said control apparatus further comprises:
 (e) a commutating circuit responsive to control signals to cause electrical power from a power source to be applied commutatively to said windings to cause said rotor to rotate in a desired direction,
 (f) testing means responsive to any back EMF generated in at least one unpowered winding to test the polarity and frequency of any back EMF generated in that unpowered winding,
 (g) the pattern reversing means comprising commutation reversing means to cause the commutation to reverse to give the correct sequence of commutation to rotate the rotor in the desired direction, and
 (h) commutation reversing actuating means to reverse the commutation when said frequency is at a value such that the motor is in the condition to be reversed and the polarity in a selected winding is substantially at a zero crossing between opposite polarities.

10. Electrical control means for cyclically controlling the supply of electrical power to an electric motor having a rotor said control means comprising switching means to switch power on and off to said motor, power on timing means to time the length of power on time when power is switched on, coasting timing means to time the length of coasting time said rotor takes from the time power is switched off thereto to the time when said rotor has slowed to a condition in which the rotor rotation may be reversed (condition for reversing), the control means controlling the amount of power applied to the motor in accordance with the coast time and reversing means to reverse the direction of said rotor when said rotor is in the condition for reversing and to switch power by said switching means when reversing is to be effected.

11. Electrical control means as claimed in claim 10 wherein a stroke time during which said rotor rotates in one direction between reversals is the sum of said power on time and said coasting time.

12. A method of cyclically controlling power to an electrical motor having a rotor, said method including the steps of starting rotation of said rotor in one direction, setting an initial power on time and applying power to said motor during said power on time, switching off power at the end of said initial power on time, allowing the rotor to slow until the rotor has slowed to a condition in which application of power will cause reversal of rotation (condition to be reversed), checking a ramp down time after power is switched off within which the rotor slows to the condition to be reversed, causing reversal of direction of rotation of said rotor, as soon as the rotor is in the condition to be reversed, and repeating the preceding steps, using the ramp down time to adjust the amount of power applied to the motor while repeating the steps.

13. A method of cyclically controlling the supply of power to an electric motor having a rotor said method including the steps of
 setting a desired time of rotation of said rotor in one direction,
 starting rotation of said rotor in said one direction,
 setting an initial power on time and applying power to said motor during said initial power on time,
 switching off the power to the motor at the end of said initial power on time, allowing the rotor to slow to a condition in which application of power to the motor will cause reversal of rotation but is still rotating (condition for reversal),
 checking a ramp down time within which the rotor takes to slow to the condition for reversal,
 causing reversal of direction of rotation of said rotor by applying power to the motor, substantially at said condition for reversal, for a further power on time which is such that said further power on time plus said ramp down time (half cycle time) equals said desired time,
 switching off power to said motor at the end of said further power on time, again checking the next said ramp down time within which the rotor takes to slow the condition for another reversal,
 again reversing direction of the rotor when said rotor is in the condition for reversal and applying power to said motor for a still further power on time which is such that said still further power on time plus said next down ramp time (half cycle time) equals said desired time and repeating the steps, starting with the step of causing reversal of direction, for a desired length of time, adjusting the power on time during at least one said half cycle time in accordance with a previous ramp down time at desired intervals of time so that the adjusted power on time for the at least one said half cycle time plus the ramp down time for the previous half cycle time equals said desired time.

14. A method of electronically cyclically controlling the supply of power to an electric motor using sensing means and actuate adjustment means for adjusting the power to the motor, said method including the steps of setting a desired speed of rotation of the motor, sensing the resistance to rotation of the motor; using responses from the sensing means for controlling the adjustment means to adjust the power supplied to the motor to change the motor speed towards said desired speed and then operate the motor within a range of speeds substantially at said desired speed of rotation, switching off the supply of power to the motor following which the motor slows to a stop and applying power to the motor and repeating the recited steps at least once, starting with the step of controlling to thereby cause a change in the adjusted power supplied to the motor in accordance with the sensed resistance to rotation of the rotor that occurred prior to the stop of the motor, with the motor running in the reverse direction.

15. A method as claimed in claim 14 which includes the step of sensing resistance to rotation by measuring the time the motor takes to run down from a power off condition to a condition in which application of power to the motor will cause reversal of rotation (condition to be reversed).

16. A method as claimed in claim 14 or claim 15 which includes the step of controlling initially causes acceleration of the motor to just below the desired speed and, after stopping of the motor, causes acceleration of the motor at least substantially up to the desired speed.

17. A method as claimed in claim 14 or claim 15 wherein the step of using responsive for controlling causes the motor, after stopping, to accelerate to a speed just above the desired speed and thereby overshoot the desired speed and then fall to the desired speed.

18. A method as claimed in claim 15 wherein the step of using responsive for controlling causes the motor speed, after stopping, to overshoot or undershoot in relation to a desired plateau level of the desired speed to give a desired vigorousness of motion to the motor.

19. A method as claimed in any one of claims 12 to 15, wherein the motor has windings on a stator driving a rotor, which method includes the steps of
(a) continuing motor rotation for a desired time, or angle or rotation,
(b) removing all power from the windings and allowing the rotor to coast towards a condition to be reversed,
(c) testing the position of the rotor relative to the stator during the coasting towards the condition to be reversed, and
(d) when the rotor is in a condition such that application of power to the windings will cause reversal of rotation (condition to be reversed) and its position relative to the stator is known, applying a changed sequence of commutations to the windings to cause the rotor to change direction, the correct commutations following automatically to maintain rotor rotation in the changed direction, and repeating the steps to give cyclical reversal for a desired time.

20. A method as claimed in claim 19, which includes the steps of following the direction and sequence of back EMFs in said windings after power has been removed therefrom and at least as the rotor nears a position where it is in the condition to be reversed checking the voltage transitions points between positive and negative for at least one of said windings and changing the sequence of commutations to the windings to cause reversal about the time when a voltage transition point occurs in at least one winding.

21. A method as claimed in claim 20 which includes the steps of testing the back EMFs from at least one said winding for polarity and frequency and changing the sequence of commutation when the frequency has fallen to a value such that the rotor is in the condition to be reversed and the polarity is at or near a zero crossing between opposite polarities in at least one said winding.

22. A method as claimed in claim 21 which includes the step of testing all the windings to indicate the position of the rotor.

23. A method as claimed in claim 22 comprising the step of enabling said changed sequence of commutations to occur within a single commutation change to cause a change in direction of rotation of the rotor.

24. An electrical control means for cyclically controlling the supply of electrical power to an electric motor having a rotor, said control means comprising switching means to switch power to said motor on and off,
power timing means to control the length of time when power is switched for a selected power on time,
coasting timing means to time the length of the coast time said rotor takes from the time power is switched off thereto to the time when said rotor is in condition for reversal of direction of rotation,
stroke time setting means to set, to a desired value, the stroke time during which said rotor rotates in one direction between reversals,
algebraic subtracting means to algebraically subtract a previous coast time from said stroke time to arrive at a time setting for said selected power on time,
reversing means to reverse the direction of said rotor when said rotor is in condition for reversal.

25. An electrical control means for cyclically controlling the supply of electrical power to an electrical motor having a rotor said control means comprising:
switching means to switch power to said motor on and off, coasting timing means to time the length of time said rotor takes from the time power is switched off thereto to the time when said rotor has slowed to a condition in which the rotor direction may be reversed (condition for reversing), reversing means to reverse the direction of said rotor when said rotor is in the condition for reversing and to switch on said switching means when reversing is to be effected and means for controlling the supply of power to said motor in accordance with a desired length of time of coasting to the condition for reversing.

26. An electrical control means for cyclically controlling the supply of electrical power to an electric motor having a rotor, said electrical control means including setting means operable to set a desired speed of rotation of the rotor of said motor, sensing means to sense resistance to rotation of the rotor prior to a reversal in direction of running of the rotor, adjustment means responsive to the resistance to rotation speed prior to a preceding reversal of running of the rotor for adjusting the power supplied to the motor to accelerate said rotor towards the desired speed and to maintain the rotor speed within a range of speeds substantially at said desired speed of rotation, switching means to switch off the supply of power to said motor after a desired time and reversing means, operable when said rotor has slowed to a condition in which the rotation direction may be reversed (condition for reversing), to reenable the preceding recited means with the rotor running in the reverse direction.

27. Electrical control means as claimed in claim 26 wherein said sensing means comprises timing means to measure the time the rotor takes to run down from a powr off condition to the condition for reversing.

28. Electrical control means as claimed in claim 26 wherein the motor has a rotor including windings; said electrical control means includes:
(e) a commutating circuit responsive to control signals to cause electrical power from a power source to be applied commutatively to said windings and to cause said rotor to rotate in a desired direction,
(f) testing means responsive to any back EMF generated in at least one unpowered winding to test the frequency and polarity of the back EMF generated in that unpowered winding, (g) the reversing means comprising commutation reversing means to reverse commutation of the commutatively applied electric power to give a correct sequence of commutation to rotate the rotor in the desired direction when the condition for reversing exists and a selected winding has a signal therein substantially at a zero crossing between opposite polarities.

29. Electrical control means as claimed in claim 26 or claim 27 wherein the motor has a stator including windings to drive the rotor; said electrical control means including means for providing commutation signals to the windings, and said reversing means comprising
   (a) counting means to count one of the time of the period of rotation and the number of rotations of the rotor in a desired direction,
   (b) communication switching means to disconnect the power from said windings,
   (c) detecting means to indicate rotor position relative to said stator, and
   (d) pattern reverse means operable by a signal from said detecting means to cause commutation signal changes to the windings which cause said rotor to change direction without testing for rotor rotational direction.

30. Electrical control means as claimed in any one of claims 25 to 27 wherein the motor has windings, and comprising braking means to brake the rotor, the braking means comprising switching means, having an impedance, to connect an end of at least one winding to an end of at least one other winding to provide a closed circuit through said impedance and the interconnected windings through which braking currents pass, the other ends of the interconnected windings being connected together, and comparator means interconnected to compare voltages between opposite ends of the windings to enable the speed of the rotor during braking to be indicated.

31. Electrical control means as claimed in any one of claims 25 to 27 wherein the motor has a stator including windings; said electrical control means further comprising braking means for braking the rotor, the braking means comprising swiching means, having an impedance, to connect one end of one winding to one end of another of said windings through said impedance, the other end of said windings being connected together, comparator means for comparing the voltages between opposite ends of the windings to enable the speed of the rotor during braking to be established.

32. A method of cyclically reversing an electronically commutated motor having a plurality of windings on a stator and a rotor having magnetic poles rotatable relative to said stator, said method comprising the steps of
   (a) removing substantially all the power from the windings and, while the rotor is rotating, allowing the rotor to coast towards zero speed of rotation, and
   (b) when the rotor has slowed to a condition in which application of a reversed commutation will cause reversal of rotation at any time between a still rotating condition of the rotor and substantially the time the rotor has stopped rotation (condition for reversing) and without delay, applying power to the stator windings and effecting entry at the correct sequence of commutations of power to the windings to cause the rotor to change direction and to maintain rotor rotation in the changed direction.

33. The method of claim 32 comprising the step of repeating the recited steps to provide cylical reversals for desired time intervals.

34. The method of claim 33 comprising the steps of testing and determining the position of the rotor relative to the stator at a later part of the coasting of the rotor before reaching zero speed of rotation, the step of effecting entry into the correct sequence of commutations being condition upon the determined position in the preceding step.

* * * * *